(12) United States Patent
Beringer et al.

(10) Patent No.: US 12,175,399 B2
(45) Date of Patent: Dec. 24, 2024

(54) SYSTEMS AND METHODS OF HYBRID INTERFACES UTILIZING CONVERSATIONAL VIRTUAL ASSISTANTS

(71) Applicant: Blue Yonder Group, Inc., Scottsdale, AZ (US)

(72) Inventors: Joerg Beringer, Irving, TX (US); Nicolas Sprotti, Mount Pleasant, SC (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 17/872,713

(22) Filed: Jul. 25, 2022

(65) Prior Publication Data
US 2022/0358448 A1 Nov. 10, 2022

Related U.S. Application Data

(63) Continuation of application No. 17/146,404, filed on Jan. 11, 2021, now abandoned.
(Continued)

(51) Int. Cl.
*G06Q 10/06* (2023.01)
*G06F 16/9032* (2019.01)
(Continued)

(52) U.S. Cl.
CPC ........... *G06Q 10/063118* (2013.01); *G06F 16/90332* (2019.01); *G06Q 10/06316* (2013.01); *G06Q 10/1097* (2013.01)

(58) Field of Classification Search
CPC ..................................................... G06Q 10/06
See application file for complete search history.

(56) References Cited

U.S. PATENT DOCUMENTS 7,809,671 B2 10/2010 Swaminathan et al.
9,912,810 B2 * 3/2018 Segre ................. H04L 51/046
(Continued)

FOREIGN PATENT DOCUMENTS

WO 2010138962 12/2010
WO WO-2010138962 A2 * 12/2010 ............. G06Q 10/04
(Continued)

OTHER PUBLICATIONS

McKinsey & Company, A Future That Works: Automation, Employment, and Productivity, McKinsey Global Institute (MGI), Jan. 2017. (Year: 2017).*

*Primary Examiner* — Kurtis Gills
(74) *Attorney, Agent, or Firm* — Spencer Fane LLP; Steven J. Laureanti

(57) ABSTRACT

A system and method for a hybrid-interface comprises a computer comprising a processor and memory and configured to assign identify a business role relationship defined in a business role relationship model defining one or more relationships between two or more business roles, assign a first business role to a virtual assistant and a second business role to a worker associated with a user input to the virtual assistant, wherein an authorization level of a response by the virtual assistant is based, at least in part, on a relationship defined in the business role relationship model for the first business role and the second business role.

20 Claims, 35 Drawing Sheets

Related U.S. Application Data

(60) Provisional application No. 62/959,518, filed on Jan. 10, 2020.

(51) Int. Cl.
   *G06Q 10/0631*   (2023.01)
   *G06Q 10/1093*   (2023.01)

(56) References Cited

U.S. PATENT DOCUMENTS

| | | |
|---|---|---|
| 10,618,093 B2 | 4/2020 | Costa |
| 11,170,335 B2 | 11/2021 | Bouhini et al. |
| 2008/0215683 A1* | 9/2008 | Swaminathan .. G06Q 10/06311 709/205 |
| 2017/0282362 A1* | 10/2017 | Erhart ................ B25J 11/008 |
| 2018/0060789 A1* | 3/2018 | Stefik ............. G06Q 10/063114 |
| 2019/0236516 A1* | 8/2019 | Ponnusamy ... G06Q 10/063114 |
| 2019/0306105 A1* | 10/2019 | Snibbe .................. G10L 25/63 |
| 2020/0104777 A1* | 4/2020 | Bouhini ........... G06Q 10/06398 |
| 2020/0106881 A1* | 4/2020 | Beaver ................. G06F 16/35 |
| 2020/0184540 A1* | 6/2020 | D'Souza ........... G06Q 30/0635 |
| 2020/0286018 A1* | 9/2020 | Chan ...................... H04L 51/02 |

FOREIGN PATENT DOCUMENTS

| | | | | |
|---|---|---|---|---|
| WO | WO-2017192684 A1 * | 11/2017 | ......... | G06F 17/2785 |
| WO | WO-2019211713 A1 * | 11/2019 | ............ | G06N 20/00 |

* cited by examiner

SYSTEMS AND METHODS OF HYBRID INTERFACES UTILIZING CONVERSATIONAL VIRTUAL ASSISTANTS

CROSS-REFERENCE TO RELATED APPLICATIONS

This application is a continuation of U.S. patent application Ser. No. 17/146,404, filed on Jan. 11, 2021, entitled "Systems and Methods of Hybrid Interfaces Utilizing Conversational Virtual Assistants," which claims the benefit under 35 U.S.C. § 119(e) to U.S. Provisional Application No. 62/959,518, filed Jan. 10, 2020, and entitled "Systems and Methods of Hybrid Interfaces Utilizing Conversational Virtual Assistants." U.S. patent application Ser. No. 17/146,404 and U.S. Provisional Application No. 62/959,518 are assigned to the assignee of the present application.

TECHNICAL FIELD

The present disclosure relates generally to user interfaces and specifically to domain-specific virtual personas providing conversational responses to worker requests.

BACKGROUND

Users expect easy access to information stored or generated in enterprise software application and analytics. While natural language assistants (NLA) have become more popular to provide easy-to-use user interfaces for e-commerce, many business users are reluctant to use natural language user interfaces owing to their limitations in presenting content. In business applications, the system often needs to present a large amount of information in response to a question. Depending on business context, a virtual assistant may also act as a proxy for a person or party which has some authorization and as such may act in a certain role on behalf of a co-worker. Current chatbot frameworks do not allow easy modeling of such roles and switching conversations between virtual and human-based assistants. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
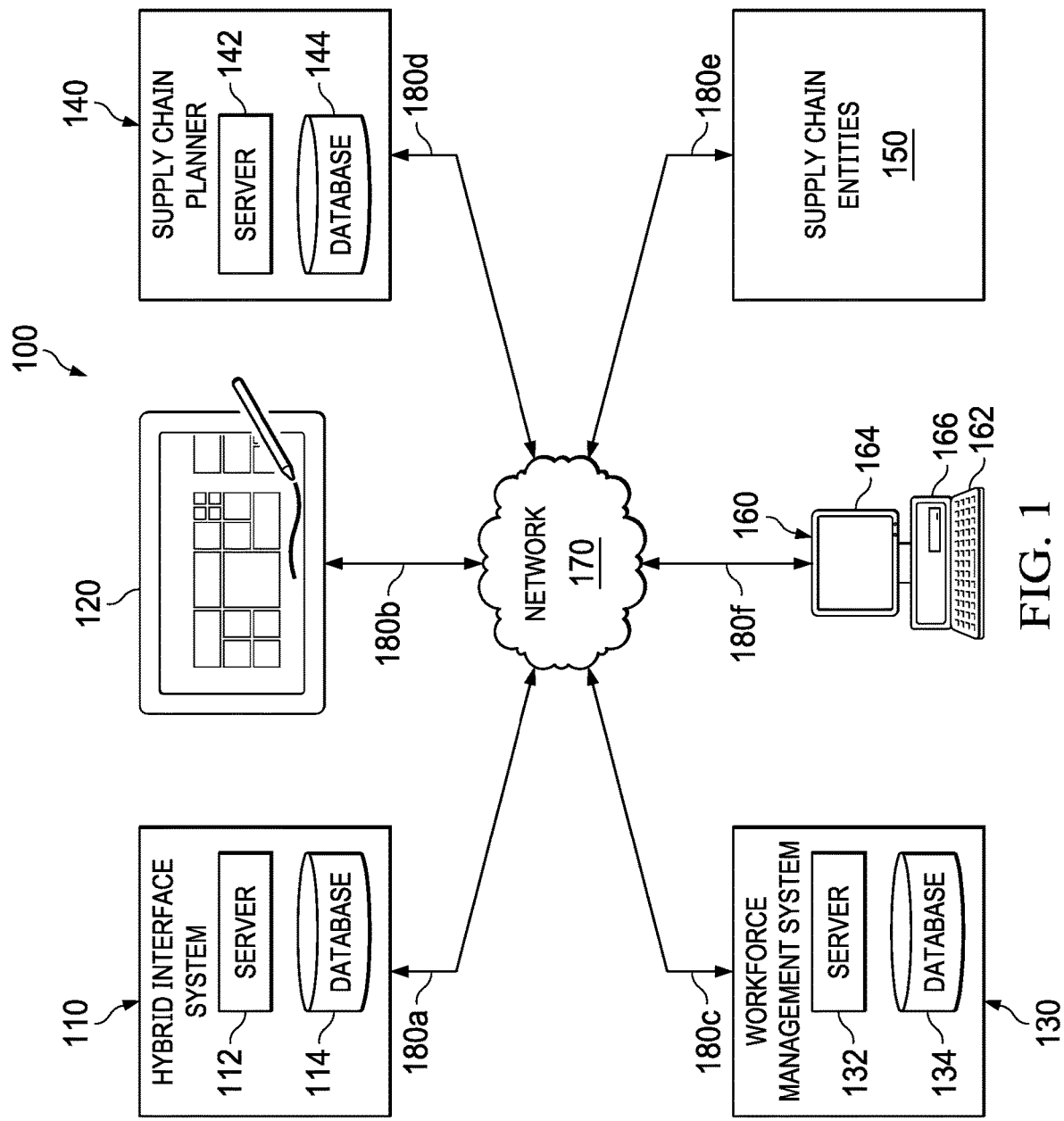
FIG. 1 illustrates a virtual persona system, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates virtual persona system 100, in accordance with a first embodiment. Virtual persona system 100 comprises hybrid interface system 110, one or more interactive display devices 120, workforce management system 130, supply chain planner 140, one or more supply chain entities 150, computer 160, network 170, and communication links 180*a*-180*f*. Although a single hybrid interface system 110, one or more interactive display devices 120, a single workforce management system 130, a single supply chain planner 140, one or more supply chain entities 150, a single computer 160, and a single network 170 are shown and described, embodiments contemplate any number of hybrid interface systems, interactive display devices, workforce management systems, supply chain planners, supply chain entities, computers, or networks, according to particular needs.

In one embodiment, hybrid interface system 110 comprises server 112 and database 114. As explained in greater detail below, hybrid interface system 110 generates a graphical user interface (GUI) with touch- or cursor-based interactions side-by-side with a chatbot interface that uses natural language processing to support voice- or text-based interactions in a conversational chat format. Hybrid interface system 110 responds to users' chat-based requests by adopting a persona of one or more virtual assistants that are created as proxies for roles of human experts working in the target environments. In addition, or as an alternative, hybrid interface system 110 leverages data from workforce management system 130 to identify roles in the target environment, create virtual assistants for these roles, and route requests requiring human expert review to the on-duty expert.

According to embodiments, hybrid interface system 110 receives user input from, and transmits system output to, one or more interactive display devices 120. In addition, or as an alternative, hybrid interface system 110 comprises natural language processing system 224 (see FIG. 2), which may receive speech-related user inputs from one or more interactive display devices 120 and transmit data and instructions to one or more interactive display devices 120 based, at least in part, on mapping the speech-related user inputs to an intent, domain, context, or the like. In response to the received data and instructions, one or more interactive display devices 120 update chatbot interface 502 (FIG. 5) and GUI interface 504 to display messages and graphics representing the answer to a question, lookup objects, offered choices, follow up actions, and/or the like. One or more interactive display devices 120 may comprise, for example, a head-mounted display, a smartphone, a tablet computer, a mobile device, a projector, or other like devices. As described in further detail below, hybrid interface system 110 uses a tablet size device in a more efficient way. On a smart phone form factor, the side-by-side display of chatbot interface 502 and GUI interface 504 may be replaced by a toggle between the chat and GUI.

In one embodiment, workforce management system 130 comprises server 132 and database 134. Workforce management system 130 may manage and organize data stored in database 134 of workforce management system, including labor demand, a labor profile, worker availability, applicable labor laws, and the like, generate lists of potential and prioritized workers, short-term workforce schedules, long-term workforce schedules, and staffing plans, and manage the creation and completion of role-related tasks, which may be proposed or assigned to one or more workers by hybrid interface system 110.

According to an embodiment, supply chain planner 140 comprises server 142 and database 144. Supply chain planner 140 models and solves supply chain planning problems to create supply chain plans. Although hybrid interface system 110 is shown and described as receiving a supply chain plan (a demand forecast) from supply chain planner 140, embodiments contemplate hybrid interface system 110 receiving any type of supply chain planning data or execution data from any supply chain planning and execution systems as an input and providing any output to one or more supply chain planning and execution systems as an output.

As shown in FIG. 1, virtual persona system 100 comprising hybrid interface system 110, one or more interactive display devices 120, workforce management system 130, supply chain planner 140, and one or more supply chain entities 150 may operate on one or more computers 160 that are integral to or separate from the hardware and/or software that support hybrid interface system 110, one or more interactive display devices 120, workforce management system 130, supply chain planner 140, and one or more supply chain entities 150. One or more computers may include any suitable input device 162, such as a keypad, mouse, touch screen, microphone, or other device to input information. An output device 164 may convey information associated with the operation of virtual persona system 100, including digital or analog data, visual information, or audio information. One or more computers may include fixed or removable computer-readable storage media, including a non-transitory computer readable medium, magnetic computer disks, flash drives, CD-ROM, in-memory device or other suitable media to receive output from and provide input to virtual persona system 100.

One or more computers may include one or more processors 166 and associated memory to execute instructions and manipulate information according to the operation of virtual persona system 100 and any of the methods described herein. In addition, or as an alternative, embodiments contemplate executing the instructions on one or more computers that cause one or more computers to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, virtual persona system 100 may comprise a cloud-based computing system having processing and storage devices at one or more locations, local to, or remote from hybrid interface system 110, one or more interactive display devices 120, workforce management system 130, supply chain planner 140, and one or more supply chain entities 150. In addition, each of the one or more computers may be a work station, personal computer (PC), network computer, notebook computer, tablet, personal digital assistant (PDA), cell phone, telephone, smartphone, wireless data port, augmented or virtual reality headset, or any other suitable computing device.

One or more supply chain entities 150 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of a virtual persona system is shown and described, embodiments contemplate any configuration of virtual persona system 100, without departing from the scope described herein.

In one embodiment, hybrid interface system 110, one or more interactive display devices 120, workforce management system 130, supply chain planner 140, and one or more supply chain entities 150, and computer may be coupled with network 170 using one or more communication links 180a-180b, which may be any wireline, wireless, or other link suitable to support data communications between hybrid interface system 110, one or more interactive display devices 120, workforce management system 130, supply chain planner 140, and one or more supply chain entities 150, computer, and network 170 during operation of virtual persona system 100. Although communication links are shown as generally coupling hybrid interface system 110, one or more interactive display devices 120, workforce management system 130, supply chain planner 140, and one or more supply chain entities 150, and computer to network 170, any of hybrid interface system 110, one or more interactive display devices 120, workforce management system 130, supply chain planner 140, and one or more supply chain entities 150, and computer may communicate directly with each other, according to particular needs.

In another embodiment, network 170 includes the Internet and any appropriate local area networks (LANs), metropolitan area networks (MANs), or wide area networks (WANs) coupling hybrid interface system 110, one or more interactive display devices 120, workforce management system 130, supply chain planner 140, and one or more supply chain entities 150, and computer. For example, data may be maintained locally to, or externally of, hybrid interface system 110, one or more interactive display devices 120, workforce management system 130, supply chain planner 140, and one or more supply chain entities 150, and one or more computers and made available to one or more associated users of hybrid interface system 110, one or more interactive display devices 120, workforce management system 130, supply chain planner 140, and one or more supply chain entities 150, and one or more computers using network 170 or in any other appropriate manner. For example, data may be maintained in a cloud database at one or more locations external to hybrid interface system 110, one or more interactive display devices 120, workforce management system 130, supply chain planner 140, and one or more supply chain entities 150, and one or more computers and made available to one or more associated users of hybrid interface system 110, one or more interactive display devices 120, workforce management system 130, supply chain planner 140, and one or more supply chain entities 150, and one or more computers using the cloud or in any other appropriate manner. Those skilled in the art will recognize that the complete structure and operation of network 170 and other components within virtual persona system 100 are not depicted or described. Embodiments may be employed in conjunction with known communications networks and other components.

Figure 2:
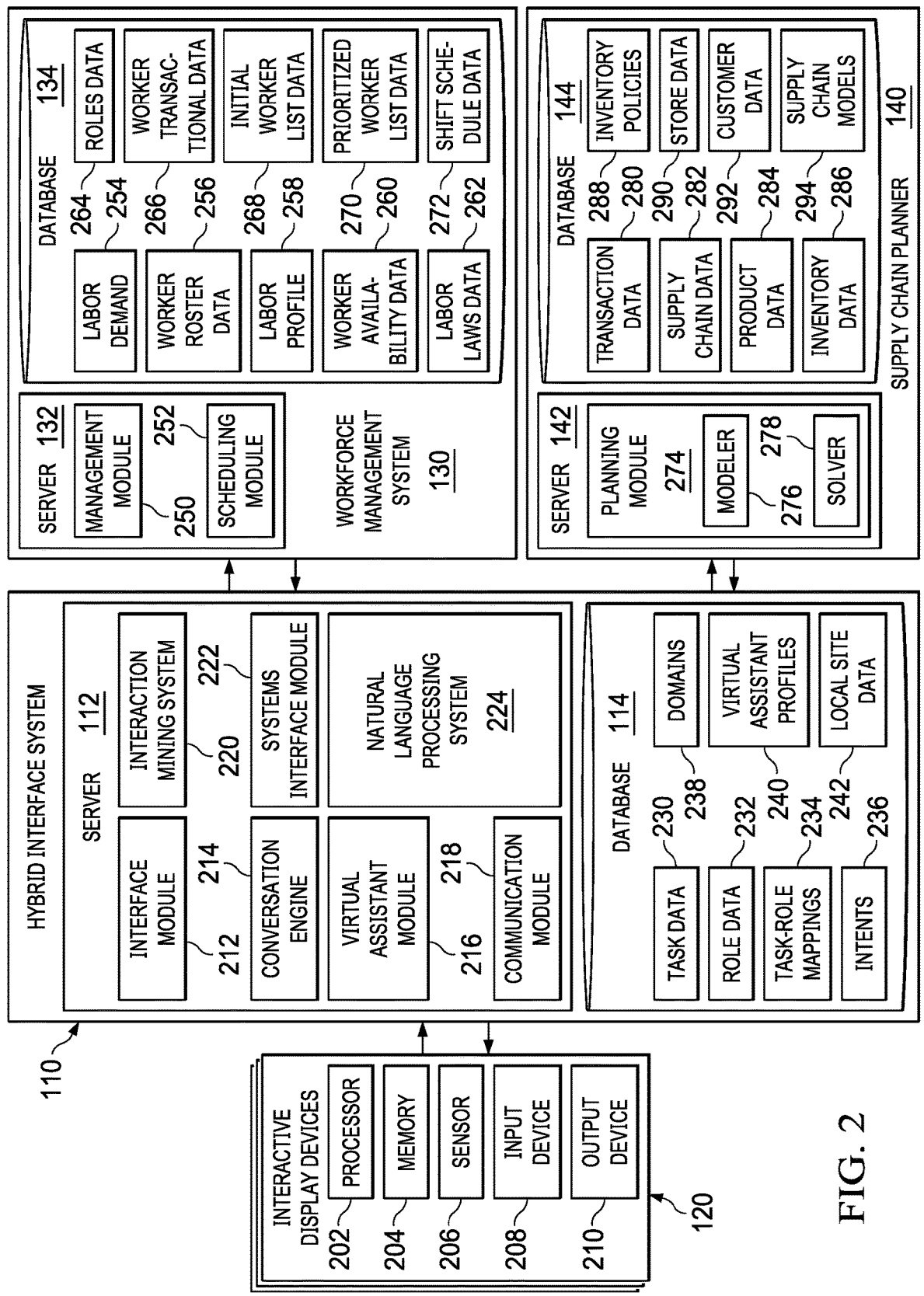
FIG. 2 illustrates the hybrid interface system, one or more interactive display devices, the workforce management system, and the supply chain planner of FIG. 1 in greater detail, in accordance with an embodiment.

FIG. 2 illustrates hybrid interface system 110, one or more interactive display devices 120, workforce management system 130, and supply chain planner 140 of FIG. 1 in greater detail, in accordance with an embodiment.

One or more interactive display devices 120 comprise one or more processors 202, memory 204, one or more sensors 206, and may include any suitable input device 208, output device 210, fixed or removable computer-readable storage media, or the like. According to embodiments, one or more interactive display devices 120 comprise an electronic device that receives imaging data from one or more sensors 206 or from one or more databases in supply chain network 100. One or more sensors 206 of one or more interactive display devices 120 may comprise an imaging sensor, such as, a camera, scanner, electronic eye, photodiode, charged coupled device (CCD), or any other electronic component that detects visual characteristics (such as color, shape, size, fill level, or the like) of objects. One or more interactive display devices 120 may comprise, for example, a mobile handheld electronic device such as, for example, a smartphone, a tablet computer, a wireless communication device, and/or one or more networked electronic devices configured to image items using one or more sensors 206 and transmit product images to one or more databases.

In addition, or as an alternative, one or more sensors 206 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more interactive display devices 120 may generate a mapping of one or more items in supply chain network 100 by scanning an identifier or object associated with an item and identifying the item based, at least in part, on the scan. This may include, for example, a stationary scanner located at one or more supply chain entities 160 that scans items as the items pass near the scanner. Hybrid interface system 110 may use the mapping of an item to locate the item in a supply chain network. The location of the item may be used to coordinate the storage and transportation of items in a supply chain network according to one or more plans and/or a reallocation of materials or capacity generated by one or more planning and execution systems. In addition, one or more sensors 206 of one or more interactive display devices 120 may be located at one or more locations local to, or remote from, one or more interactive display devices 120. For example, one or more sensors 206 are integrated into one or more interactive display devices 120, or one or more sensors 206 are remotely located from, but communicatively coupled with, one or more interactive display devices 120.

As disclosed above, hybrid interface system 110 comprises server 112 and database 114. Although hybrid interface system 110 is shown as comprising a single server 112 and a single database 114, embodiments contemplate any suitable number of servers or databases internal to, or externally coupled with, hybrid interface system 110. Server 112 of hybrid interface system 110 comprises interface module 212, conversation engine 214, virtual assistant module 216, communication module 218, interaction mining system 220, systems interface module 222, and natural language processing system 224. Although server 112 is shown and described as comprising a single interface module 212, a single conversation engine 214, a single virtual assistant module 216, a single communication module 218, a single interaction mining system 220, a single systems interface module 222, and a single natural language processing system 224, embodiments contemplate any suitable number or combination of these located at one or more locations, local to, or remote from hybrid interface system 110, such as on multiple servers or computers at one or more locations in virtual persona system 100.

In one embodiment, interface module 212 generates a multi-level navigable interactive GUI. Conversation engine 214 provides chatbot interface 502 displaying chronologically-ordered incoming and outgoing messages. In addition and as disclosed above, hybrid interface system 110 displays chatbot interface 502 and GUI interface 504 side-by-side and provides for interactive informing and responding between chatbot interface 502 and GUI interface 504. GUI interface 504 responds to actions that are contextually related to messages and interactions in chatbot interface 502 and provides a seamless transition between speech- and language-based interactions and touch- or cursor-based interactions, whether the micro-episode benefits from a rich display and touch interaction or requires only a short single spoken answer.

As described in further detail below, virtual assistant module 216 generates virtual assistants from roles corresponding to human experts and which are automatically associated to an on-duty human expert providing a seamless transition for a user between a virtual assistant and a human expert. The virtual assistants may be assigned a persona corresponding to an on-site human expert or a remotely-located tier-two level support human expert. In the non-limiting examples provided below, hybrid interface system 110 provides three virtual assistants: a chef for a kitchen, a supervisor for shift management, and a logistics expert for deliveries. When using one or more interactive display devices 120, a worker may receive personalized, direct interaction or automatically initiate an interaction based on a query, content, or status of retrieved information. By way of example only and not by way of limitation, a restaurant of a grocery retailer, warehouse store, a standalone restaurant, or other like food preparation location may prepare safe and palatable food. Continuing with this example, the food preparation location may desire to not hire a chef to handle requests for each worker because it would be cumbersome and expensive. Hybrid interface system 110 provides for high-quality cooking in a chef-less kitchen by workers with little or no training by providing an interactive display that guides the worker step-by-step through individual tasks, provides information to the worker in real time and in context to provide the rationale behind certain actions, and provides the workers with a better understanding of their role, tailored to the worker's individual learning needs. Although the examples are shown and described as including a chef, a supervisor, and a logistics expert, embodiments contemplate creating any virtual persona for expertise areas, which are relevant other verticals, domains 238, supply chain entities 150, or other users of one or more interactive display devices 120.

According to embodiments, chatbot interface 502 displays an avatar indicating the virtual assistant is the sender of the system-generated response when mapping speech input to a user intent. Policies and rules in conversation engine 214 and/or natural language processing system 224 however may route certain questions directly to the human expert. Communication module 218 comprises a communication channel interface between one or more user communication devices, including one or more interactive display devices 120, and one or more other communication systems, which may include, for example, an interactive display device or other types of electronic communication devices. For example, communication module 218 may comprise Voice-Over-Internet-Protocol (VOIP), email, internet or web-based chat, and/or other types of electronic communication providing one or more communication devices to contact one or more other communication devices. According to embodiments, communication module 218 receives a text, audio, or video communication from one or more interactive display devices 120 or from any other communication device local to, or remote from, virtual persona system 100 and transmits the received communication to other communication devices local to, or remote from, virtual persona system 100. Embodiments contemplate communication module 218 receiving a communication in one format and altering the format for transmission to a different format. In one embodiment, requests which need approval are routed automatically to a human co-worker who is on duty. In addition, or as an alternative, a user may directly message the on-duty expert sharing the role with the virtual assistant, who is identified by the workforce management solution based on a shift plan and time clock entries.

Interaction mining system 220 provides analytics of the dialogue flows to the human holding one of the roles assigned to a virtual assistant or business analysts to understand what the most common information needs are, and what phrases could not be mapped to any intent in conversation engine 214. The expert who is associated with the virtual assistant may mine the conversation to identify (e.g. from popular or unhandled speech acts) the information and training needs of the workforce. In addition, or as an alternative, interaction mining system 220 may provide for monitoring, mining, and analyzing messages sent and received in the dialogue, graphic, and textual elements displayed in connection with the messages, the flow of the interactivity, usage time, delay between information presented and a next activity, GPS or location data, location of a cursor or a user's eye movement, camera input, any machine communicatively coupled with one or more interactive display devices 120, one or more scanners (including a bar code scanner), and the like. Interaction mining system 220 may provide analytics indicating the most popular user requests or queries, identification of requests have not been handled, steps or activities that may be eliminated to reduce confusion, and word choices that improve understanding of task requirements, changing dialogue or word content automatically based on text analysis and automatic rephrasing, interpretation of education level, demographics of workers, store location, and the like.

Systems interface module 222 comprises a gateway between hybrid interface system 110 and one or more interactive display devices 120, workforce management system 130, and supply chain planner 140. According to embodiments, systems interface module 222 transmits and receives electronic communication with any number of one or more planning and execution entities, remote data storage, and/or other external sources of data.

Hybrid interface system 110 employs natural language processing system 224 to implement natural language phrases related to information needs, user input, initiations of services, or the like. In one embodiment, hybrid interface system 110 transmits voice- and text-based user inputs a third-party natural language processing system (such as, for example, GOOGLE Dialogue Flow or MICROSOFT Bot Framework) and receives the intent mapped to the voice input. As described in further detail below, intents 236 may be grouped by domains 238, such as, for example, cooking of food, managing a shift, managing inventory of a store, managing deliveries, and the like; the domains 238, in turn, may be assigned to a virtual assistant in accordance with its role. According to embodiments, natural language processing system interprets a user input according to one or more meta-classes such as, for example, RECOGNIZE <specific information>, OVERVIEW <data set>, SELECT <option>, ENTER <content>, INITIATE <execution of service>, and/or the like. By way of example only and not by way of limitation, identifying a user intent according to the RECOGNIZE meta-class comprises identifying a single value, face or item and providing by an output device, a name, value, fact, or the like. In addition, or as an alternative, an OVERVIEW meta-class comprises identifying a dataset or collection of items and providing by an output device, a list of items or datasets, a summary statement of the items or data sets, a first item or a predetermined number of items or datasets, and the like. According to embodiments, a SELECT meta-class comprises selecting an existing item or value and providing for an input to displayed or predetermined list or dataset, a selection from a list of options (including a dynamic list of options), and the like. Embodiments contemplate an ENTER meta-class that identifies user-defined content within the natural language input and provides for entry of user-input according to the interpretation by the natural language system 224. Embodiments of the INITIATE meta-class comprises executing a service, which may include executing a service according to one or more parameters identified in the natural language input. As described in further detail below, the intent of the natural language input may be interpreted according to the complexity of the response, wherein the complexity of the response may be based on the quantity, richness, or other quality of the data. According to an embodiment, intents determined according to the RECOGNIZE, ENTER, and INITIATE meta-classes may comprise a low-complexity. In addition, or as an alternative, intents determined according to the OVERVIEW and SELECT meta-classes comprise difficult or high-complexity. As described in further detail below, hybrid interface system 110 displays a response using one or both of chatbot interface 502 and GUI interface 504 according to the an intent and a complexity of a natural language input.

Database 114 of hybrid interface system 110 may comprise one or more databases or other data storage arrangement at one or more locations, local to, or remote from, server 112. Database 114 of hybrid interface system 110 comprises, for example, task data 230, role data 232, task-role mappings 234, intents 236, domains 238, virtual assistant profiles 240, and local site data 242. Although database 114 of hybrid interface system 110 is shown and described as comprising task data 230, role data 232, task-role mappings 234, intents 236, domains 238, virtual assistant profiles 240, and local site data 242, embodiments contemplate any suitable number or combination of these or other types of data, located at one or more locations, local to, or remote from, hybrid interface system 110 according to particular needs.

In one embodiment, task data 230 may be received from workforce management system 130, which describes the action items and roles associated with each task. In addition, the tasks are associated with modeled dialogue which is used by virtual assistant module 216 to provide responsive language displayed by chatbot interface 502. The modeled dialogue comprises query responses, task assignment or proposals, the current state of a task, status or information related to one or more workers, and the like.

Role data 232 is a collection of tasks that need to be performed by a worker during a shift to meet the needs of the business. In one embodiment, hybrid interface system 110 receives one or more tasks mapped to one or more roles that will be assigned to the virtual assistant from workforce management system 130. In addition, or as an alternative, hybrid interface system 110 determines task-role mappings 234 to be automated by the virtual assistants by identifying human experts, identifying the role held by the human expert, and selecting one or more tasks that may be implemented using one or more interactive display devices 120.

According to embodiments, natural language processing system 224 assigns the best-matching intents 236 to speech inputs received from one or more users, after identifying natural language phrasing related to information needs, user input, and initiations of services to perform one or more tasks for one or more roles. Intents 236 are categorical assignments that describe the purpose or goal of the user speech input. By way of example only and not by way of limitation, the speech input "is Jim here?" may be mapped to the intent, "Did employee X check in?" Because multiple alternative phrases may be mapped to the same intent, other phrases may be mapped to this intent may include, for example, "I have not seen Jim." "Which employees have checked in today?" "Is there a cashier on duty today?" and other like phrases. In addition, or as an alternative, intents 236 are associated with one or more domains 238 that indicate the system or virtual assistant expertise that will handle the intent (such as, for example, kitchen and food preparation activities, workforce management, employee and site-related productivity and waste, scheduling, strategic planning, delivery and shipments, and the like. Intents 236 and domains 238 may be determined in a context-specific manner. For example, if a speech input comprises, "Did he check in?" natural language processing system 224 may use contextual data to identify which worker is being referred to by the pronoun, "he." Contextual data may include, but is not limited to, previously-identified speech, the text or graphics currently displayed on chatbot interface 502, GUI interface 504, the relationships between different roles in a labor hierarchy, and other like data.

As part of the fulfillment of a recognized intent, conversation engine 214 sends an event to a service of hybrid interface system 110 or interactive display device, and which is mapped to corresponding GUI interface 504. According to one embodiment, GUI interface 504 displays an answer to a question, an analytic to a question, a single object or object list in response to a query or lookup, a list with choices, or a guided procedure comprising any number of one or more activities, according to particular needs. GUI interface 504 may offer navigation which is aligned with the context model of the dialogue flow. For example, when GUI interface 504 shows options or response alternatives, those may also be enabled in chatbot interface 502. In addition, or as an alternative, fulfillment of the intent may include flagging or tagging the speech input to automatically route the input and/or the intent to the human expert, instead of the virtual assistant.

After grouping intents 236 by one or more domains 238, each of the one or more domains 238 is associated with a virtual assistant having a particular role. Virtual assistant profiles 240 comprise models indicating the domain associated with the virtual assistant to perform the activities of automated task-role mappings 234 and to initiate particular communications to a worker with the role if the task is non-automated. For example, the chef virtual assistant may perform kitchen supervisory activities fully automatically and provide simple and continually improved instructions to workers who need pre-training to perform the task. Embodiments contemplate ordering, delivering, and having multiple levels of flags that raise the issue to a different level.

Local site data 242 comprises data describing the sites of one or more supply chain entities 150 and related site information. Local site data 242 may comprise, for example, a site ID, site description, site location details, site location climate, site type, site opening date, site area (expressed in, for example, square feet, square meters, or other suitable measurement), latitude, longitude, and other similar data. Local site data 242 may comprise one or more site maps, stocking location maps, and the like. In one embodiment, a stocking location map comprises identification, location, dimensions, weight, and orientation of items in a representational layout that corresponds to the physical locations of the items, and may include, for example, coordinates indicating the current location of the items. Embodiments contemplate tracking item location throughout one or more supply chain entities 150 including various stocking locations within a particular site, and updating the location on the local site map or item map corresponding to the location of the item.

By way of example only and not by way of limitation, hybrid interface system 110 is shown and described in the following description as communicatively coupled with workforce management system 130 and supply chain planner 140. Although hybrid interface system 110 is shown and described as communicatively coupled with workforce management system 130 and supply chain planner 140, embodiments contemplate hybrid interface system 110 operably coupled with any number of planning and execution systems or other enterprise systems and networks, according to particular needs.

According to embodiments and as disclosed above, workforce management system 130 may comprise server 132 and database 134. Although workforce management system 130 is shown as comprising a single server 132 and a single database 134, embodiments contemplate any suitable number of servers or databases internal to, or externally coupled with, workforce management system 130. Server 132 of workforce management system 130 may comprise management module 250 and scheduling module 252. Although server 132 is shown and described as comprising a single management module 250 and a single scheduling module 252, embodiments contemplate any suitable number or combination of these or other modules located at one or more locations, local to, or remote from workforce management system 130, such as on multiple servers or computers at any location in virtual persona system 100.

Management module 250 accesses workforce management data stored in database 134 of workforce management system 130, such as, for example, labor demand, a labor profile, worker availability, and applicable labor laws. Scheduling module 252 may choose available workers to fill the labor demand in compliance with applicable labor laws, and may generate a list of possible workers to staff one or more roles on a shift schedule, which may include prioritization of particular workers to roles on the shift schedule according to one or more worker performance, skill metrics, or tasks assigned to one or more roles. Scheduling module 252 may further access labor demand data 254 and the prioritized list of workers (prioritized worker list data 270) stored in database 134 and generate a finalized shift schedule, assigning prioritized workers to each of the one or more roles available in the shift schedule, as described in further detail below. In one embodiment, scheduling module 252 generates workforce schedules for short-term periods, such as for example, workforce schedules for one or two weeks, a month, a pay period, or the like. When creating short-term workforce schedules, scheduling module 252 may use a fine level of resolution, such as, for example, fifteen minutes, to calculate and generate work schedules. When calculating a long-range staffing plan, workforce management system 130 may determine which worker role assignments are valid by filtering jobs/roles not assigned to a site and also takes into account existing role exclusions. Both primary and secondary jobs may be included, provided the job is active for the worker within the timeframe of the long-range staffing plan.

Database 134 of workforce management system 130 may comprise one or more databases or other data storage arrangements at one or more locations, local to, or remote from, server 132. According to embodiments, database 134 comprises labor demand data 254, worker roster data 256, labor profile data 258, worker availability data 260, labor laws data 262, roles data 264, worker transactional data 266, initial worker list data 268, prioritized worker list data 270, and shift schedule data 272. Although database 134 is shown and described as comprising labor demand data 254, worker roster data 256, labor profile data 258, worker availability data 260, labor laws data 262, roles data 264, worker transactional data 266, initial worker list data 268, prioritized worker list data 270, and shift schedule data 272, embodiments contemplate any suitable number or combination of these, located at one or more locations, local to, or remote from, workforce management system 130, according to particular needs.

Labor demand data 254 comprises data specifying the upcoming staffing needs of an organization and/or business entity. According to embodiments, labor demand data 254 comprises a list of known work shifts (such as, for example, front cashier shifts that match the dates and times at which an organization is open for business) to which workers to work the shifts have not yet been assigned. Worker roster data 256 comprises a list of workers currently available to work at an organization and/or business entity, such as, for example, one or more supply chain entities 150 associated with virtual persona system 100. In addition, or as an alternative, worker roster data 256 comprises a worker's primary job and a secondary job. According to embodiments, workforce management system 130 may periodically update labor profile data 258 to reflect the employment or departure of available workers within an organization and/or business entity. In one embodiment, labor profile data 258 comprises the workgroups of the business, enterprise, or other organization, the jobs associated with the workgroups, and the roles associated with those jobs. A worker may be counted toward worker availability when the worker has either a primary job or a secondary job listed on the labor profile for a particular site.

Worker availability data 260 comprises the available-to-work schedules of the workers stored in labor profile data 258. Workers may arrange to take particular days or times of days off work, and are not available to work shifts during these scheduled off periods. In an embodiment, worker availability data 260 maintains a list of dates and times at which each worker stored in labor profile data 258 is unavailable. Labor laws data 262 comprises scheduling constraints for compliance with one or more applicable labor laws. In one embodiment, worker availability data 260 comprises any one or more of: time off requests, minor laws, general availability, and worker status effects. In addition, worker availability may be subject to one or more worker constraints, which may include, for example, minimum and/or maximum weekly hours, minimum and/or maximum daily hours, minimum and/or maximum shift length, maximum days per week, maximum consecutive days in week, maximum consecutive days across weeks, the ability to work split shifts, and minimum weekly values (including days per week and consecutive days), minimum daily values, contract guaranteed hours, and fixed shifts.

Roles data 264 defines the tasks and other requirements associated with each role. A shift schedule may comprise several roles (such as, for example, supervisor, cashier clerk, warehouse clerk, kitchen worker, chef, and the like). By way of example only and not by way of limitation, roles data 264 comprises, for a particular role, one or more of: role title (such as "Shift Manager"), role duration (such as an 8-hour shift on a particular day), role requirements (such as, for example, "manage subordinate on-site workers," "operate checkout cashier," or "stock shelves, offload incoming shipments, and pack outgoing shipments for transport"), role KPIs that measure the effectiveness of a worker according to defined metrics, and role KPI weights that rank the most important KPIs for each particular role by percentage, as described in further detail below. In addition, or as an alternative, roles are configurable by hybrid interface system 110, as described in further detail below.

Worker transactional data 266 may comprise, among other data, worker performance measurements according to one or more KPIs. KPIs may include, for example, worker pay rate, worker performance (e.g. the number of shifts worked in a particular time period, ratio of planned shifts to completed shifts, overtime, punctuality, clocking in or out outside of set schedule, etc.) forecasted overtime, worker productivity, experience, covering unplanned shifts, and/or seniority). In an embodiment, KPIs of worker transactional data 266 may correspond to the KPI requirements for a particular role stored in roles data 264 (for example, in an organization in which worker pay rate for each role is a major role KPI, worker transactional data 266 may store, among other data, worker pay rate for each worker. Initial worker list data 268 may store one or more initial lists of workers generated by the sorting engine prior to prioritization. Prioritized worker list data 270 may store one or more prioritized lists of workers generated by the prioritization engine. Shift schedule data 272 may store one or more completed shift schedules generated by scheduling engine 252.

As disclosed above, supply chain planner 140 comprises server 142 and database 144. Although supply chain planner 140 is shown as comprising a single server 142 and a single database 144, embodiments contemplate any suitable number of servers or databases internal to or externally coupled with supply chain planner 140. Server 142 of supply chain planner 140 comprises planning module 274 having modeler 276 and solver 278. Although server 142 is shown and described as comprising a single planning module 274 having a single modeler 276 and a single solver 278, embodiments contemplate any suitable number or combination of planning modules, modelers, and solvers located at one or more locations, local to, or remote from supply chain planner 140, such as on multiple servers or computers at one or more locations in virtual persona system 100. Server 142 of supply chain planner 140 comprises planning module 274. Planning module 274 may comprise modeler 276 and solver 278. Although planning module 274 is shown and described as comprising a single modeler 276 and a single solver 278, embodiments contemplate any suitable number or combination of these located at one or more locations, local to, or remote from planning module 274, such as on multiple servers or computers at any location in virtual persona system 100.

Modeler 276 may model one or more supply chain planning problems of the supply chain entities. According to one embodiment, modeler 276 identifies resources, operations, buffers, and pathways, and maps the supply chain entities using supply chain entity models, as described in further detail below. For example, modeler 276 models a supply chain planning problem that represents the supply chain entities as, for example, a supply chain network model, a Linear Programming (LP) optimization problem, or other type of input to a supply chain solver. According to embodiments, solver 278 of planning module 274 generates a solution to a supply chain planning problem. Solver 278 may comprise an LP optimization solver, a heuristic solver, a mixed-integer problem solver, a MAP solver, an LP solver, a Deep Tree solver, and the like. Although particular solvers are described, embodiments contemplate any suitable solver according to particular needs.

Database 144 of supply chain planner 140 may comprise one or more databases or other data storage arrangement at one or more locations, local to, or remote from, server 142. Database 144 of supply chain planner 140 comprises, for example, transaction data 280, supply chain data 282, product data 284, inventory data 286, inventory policies 288, store data 290, customer data 292, and supply chain models 294. Although database 144 of supply chain planner 140 is shown and described as comprising transaction data 280, supply chain data 282, product data 284, inventory data 286, inventory policies 288, store data 290, customer data 292, and supply chain models 294, embodiments contemplate any suitable number or combination of data, located at one or more locations, local to, or remote from, supply chain planner 140, according to particular needs.

Transaction data 280 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 150 including, for example, item data, identifiers, metadata (comprising dimensions, hierarchies, levels, members, attributes, cluster information, and member attribute values), fact data (comprising measure values for combinations of members) of one or more supply chain entities 150. Supply chain data may also comprise for example, various decision variables, business constraints, goals, and objectives of one or more supply chain entities 150. According to some embodiments, supply chain data 282 may comprise hierarchical objectives specified by, for example, business rules, master planning requirements, scheduling constraints, and discrete constraints, including, for example, sequence dependent setup times, lot-sizing, storage, shelf life, and the like.

Product data 284 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 may comprise any data relating to current or projected inventory quantities or states, order rules, or the like. For example, inventory data 276 may comprise the current level of inventory for each item at one or more stocking points across one or more supply chain entities 150. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, hybrid interface system 110 and supply chain planner 140 access and store inventory data 286 in database 144, which may be used by supply chain planner 140 to place orders, set inventory levels at one or more stocking points, initiate manufacturing of one or more components, or the like in response to, and based at least in part on, a supply chain plan or other output of supply chain planner 140. In addition, or as an alternative, inventory data 286 may be updated by receiving current item quantities, mappings, or locations from hybrid interface system 110, an inventory system, and/or one or more networked imaging devices 120.

Inventory policies 288 may comprise any suitable inventory policy describing the reorder point and target quantity, or other inventory policy parameters that set rules for the planning and execution system to manage and reorder inventory. Inventory policies 288 may be based on target service level, demand, cost, fill rate, or the like. According to embodiment, inventory policies 288 comprise target service levels that ensure that a service level of one or more supply chain entities 150 is met with a certain probability. For example, one or more supply chain entities 150 may set a service level at 95%, meaning one or more supply chain entities 150 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, supply chain planner 140 may determine a replenishment order according to one or more replenishment rules, which, among other things, indicates to one or more supply chain entities 150 to determine or receive inventory to replace the depleted inventory. By way of example and not of limitation, an inventory policy for non-perishable goods with linear holding and shorting costs comprises a min./max. (s,S) inventory policy. Other inventory policies may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data. Store data 290 may include demand forecasts for each store indicating future expected demand based on, for example, any data relating to past sales, past demand, purchase data, promotions, events, or the like of one or more supply chain entities 150. The demand forecasts may cover a time interval such as, for example, by the minute, hour, daily, weekly, monthly, quarterly, yearly, or any suitable time interval, including substantially in real time. Although demand forecasts are described as comprising a particular store, the planning and execution system may calculate a demand forecast at any granularity of time, customer, item, region, or the like.

Customer data 292 may comprise customer identity information, including, for example, customer relationship management data, loyalty programs, and mappings between one or more customers and transactions associated with those one or more customers such as, for example, product purchases, product returns, customer shopping behavior, and the like. Customer data 292 may comprise data relating customer purchases to one or more products, geographical regions, store locations, time period, or other types of dimensions.

Supply chain models 294 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 294 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

As disclosed above, modeling one or more supply chain entities 150 provides modelling of various material and capacity constraints and demand requirements. To create a supply chain network model, the supply chain entities associated with hybrid interface system 110 may be modelled to represent the flow materials and resources between one or more supply chain entities 150 in accordance with the constraints at each operation, buffer, and resource.

Figure 3:
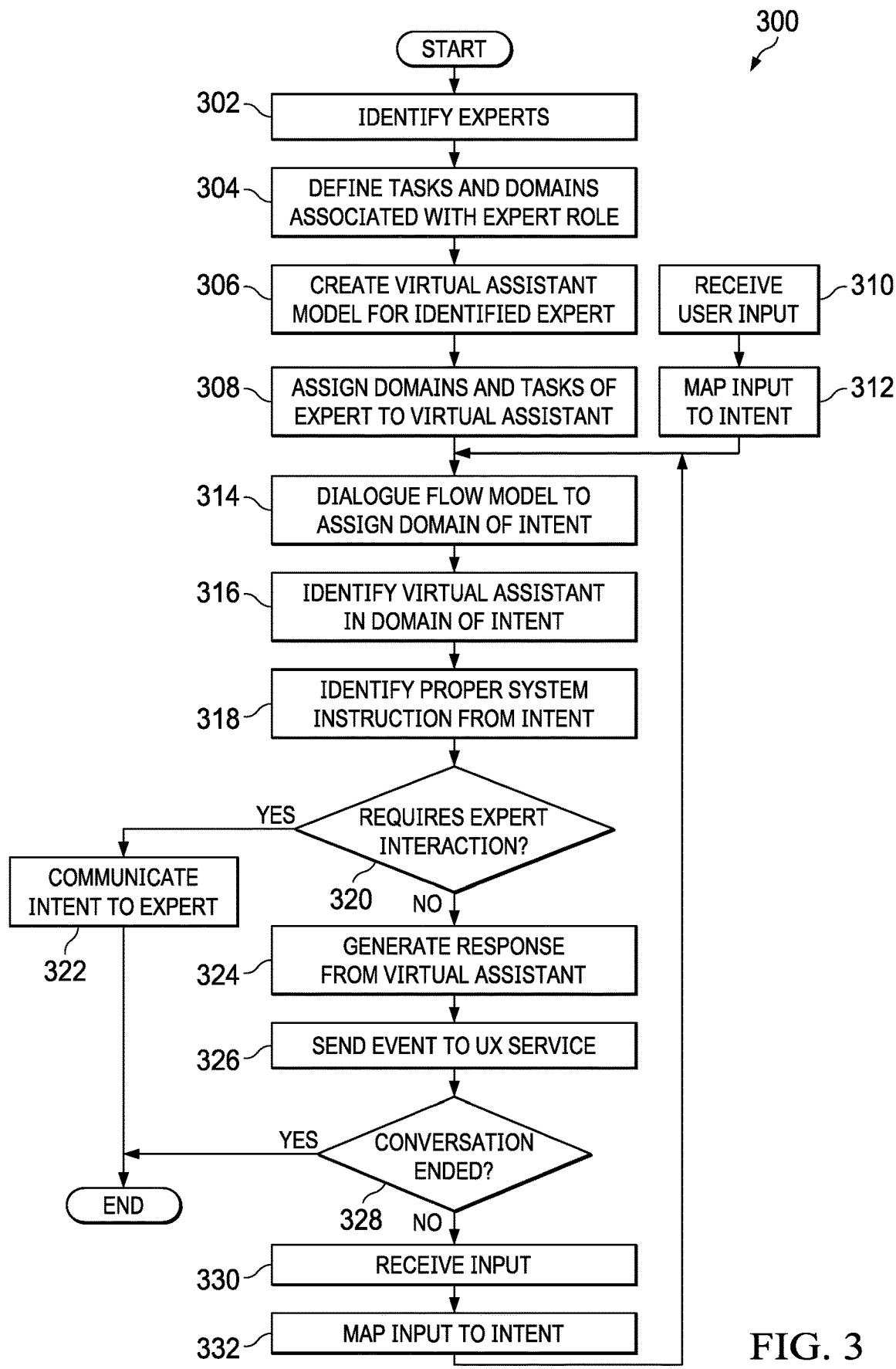
FIG. 3 illustrates a method of responding to requests using the hybrid interface system, in accordance with an embodiment.

FIG. 3 illustrates a method of responding to requests using hybrid interface system 110, in accordance with an embodiment. The method proceeds by one or more activities, which, although described in a particular order may be performed in one or more permutations, according to particular needs.

Method 300 begins at activity 302 with workforce management system 130 identifying roles corresponding to human experts in a target environment. In one embodiment, a human expert is a person whose role-related tasks include providing information to workers holding other roles to complete their role-related tasks. In addition, or as an alternative, a human expert is a person whose role-related tasks include performing an activity (or authorizing the activity) needed by workers holding other roles to complete their role-related tasks. In example scenarios, and as described in further detail below, three experts are identified: a chef in a kitchen who oversees a team of food preparation workers, a supervisor who oversees time entry and product waste, and a logistics expert who distributes delivery schedules and production plans. Although the three example human experts are shown and described as a chef, a supervisor, and a logistics expert, embodiments contemplate identifying a human expert associated with any role whose tasks require providing information for the completion of a task to the same role, another role, different verticals, or domains 238 or supply chain entities, according to particular needs. In addition, embodiments contemplate human experts locally available at an on-site location or working in a central office supporting multiple locations as tier-two level support.

At activity 304, the tasks and domains 238 associated with the expert role are defined. The one or more tasks associated with each role may be received from, or transmitted to, workforce management system 300. In one embodiment, hybrid interface system 110 determines the domain of the tasks by providing natural language phrases and intents 236 associated with the tasks to natural language processing system 224. After creating a library of intents 236 describing different phrasing and parameters related to information needs, user input, or initiations of service or other activities that define the tasks, the dialogue flow model groups intents 236 to domains 238, such as, for example, preparation of food, managing a shift, managing inventory of a store, and the like. Although domains 238 are described by the previous examples, embodiments contemplate domains 238 grouping any one or more activities of any number of one or more tasks into any number of domains 238, according to particular needs. At activity 306, hybrid interface system 110 creates a model for each virtual assistant. As disclosed above, a virtual assistant may be created for a human expert role. In the previous example, human expert roles were identified as a chef, a supervisor, and a logistics expert. In one embodiment, hybrid interface system 110 creates a virtual persona model for each of these three identified roles, or other roles, according to particular needs.

At activity 308, hybrid interface system 110 assigns domains 238 and tasks of the human expert to the virtual assistant persona. According to embodiments, hybrid interface system 110 assigns tasks to the virtual assistant based, at least in part, on its assigned role. By way of example only and not by way of limitation, hybrid interface system 110 creates a virtual assistant for a "chef" role. Tasks associated with the chef role may include, for example, tracking perishable inventory, identifying substitute ingredients or alternative recipes, providing instructions for preparing or cooking food, and restocking or replenishing items. By way of a further example and not by way of limitation, hybrid interface system 110 may create virtual assistants that perform tasks associated with a supervisor role and a logistics manager role, as described in further detail below. Although the virtual assistants are shown and described as performing task associated with roles for a chef, supervisor, and logistics manager, in some embodiments, virtual assistants may be created to perform any number of one or more tasks associated with any number of one or more roles, according to particular needs. In addition, or as an alternative, one or more roles and one or more tasks may be mapped and defined in workforce management system 130. In this embodiment, hybrid interface system 110 may create the virtual assistant by selecting a role from workforce management system 130 and the tasks assigned to the virtual assistant are those tasks assigned to the role in workforce management system 130.

At activity 310, natural language processing system 224 receives a user input and, at activity 312, maps the input to an intent. As disclosed above, intents 236 are assigned to natural language phrases that relate to one or more tasks. When providing the user speech or text input to natural language processing system 224, natural language processing system 224 assigns the intent of the natural language phrase that best matches the speech or text input. At activity 314, hybrid interface system 110 determines the domain of the intent. As disclosed above, a dialogue flow model groups intents 236 to domains 238. At this activity, hybrid interface system 110 receives the intent from natural language processing system 224 and determines the domain assigned to that intent.

At activity 316, hybrid interface system 110 identifies the virtual assistant associated with the domain. As disclosed above, the domains 238 are assigned to the virtual assistant. According to embodiments, hybrid interface system 110 uses the domain of the intent identified from the user speech or text input to identify the proper virtual assistant in whose persona the response to the user input will be sent. By way of example only and not by way of limitation, the virtual assistant is used as the avatar when sending a message in chatbot interface 502 when responding to an intent grouped into that virtual assistant's assigned domain.

At activity 318, hybrid interface system 110 determines the instructions associated with the determined intent. In one embodiment, a natural language processing system determines the instructions associated with determined intent, wherein the instructions comprise one or more of: a response to send using a persona to one or more interactive display devices 120 of a user or an event causing the UI to initiate some activity (such as fetching data to display on the display).

At activity 320, hybrid interface system 110 determines if the instructions indicate that the intent requires human expert interaction. When the instruction indicate the intent requires human expert interaction, the intent is communicated to the human expert, at activity 322. The current on-duty expert is identified by workforce management system 130 based on shift planning, punch in, and/or other types of employee location system. The dialogue engine may contain policies and rules that route certain questions directly to the human experts. While the benefits of augmenting or replacing a high-value worker (such as an expert) with an automated system is not difficult to discern, in reality, there are simply too many fringe cases that cannot usually be efficiently or entirely covered by the trained model, such that, humans still play a role in many implementations of virtual assistants. In addition, some tasks (whether for practical, ethical, legal, safety, or other reasons) maintain a human within the decision process or as the actor carrying out the action. By way of example only and not by way of limitation, user-request that requires approval by a supervisor may be routed automatically to a real-world worker who is on duty. In addition, embodiments of hybrid interface system 110 provide for a user to send a message directly to a human expert by "double clicking" (or some other selection process) a virtual assistant avatar.

The human expert who is associated with the virtual assistant may mine the conversation and learn from popular or unhandled speech acts what the information needs of the workforce are and identify need for training. Analytics about this dialogue flows are available to the actual user role or business analysts to understand what the most common information needs are, and what phrases could not be mapped to an intent in conversation engine 214. Returning to activity 320, when the instructions indicate the intent does not require human expert interaction, the response associated with the intent is communicated to one or more interactive display devices 120 in the persona of the virtual assistant assigned to the domain of the intent, at activity 324. When mapping speech input to a user intent, the chatbot displays the respective virtual assistant as the sender of the system-generated response.

At activity 326, when the instructions of the intent indicate that the response is associated the user interface of one or more interactive display devices 120, hybrid interface system 110 transmits an event to the user experience module. As part of the fulfillment of a recognized intent, the dialogue engine sends an event to a user experience service which is mapped to the corresponding GUI. This GUI may offer navigation which is aligned with the context of the dialogue flow. For example, if the GUI shows options or response alternatives, those will also be enabled in conversation engine 214. When requesting information, hybrid interface system 110 may transmit a considerable amount of information back to the user as response to a question. Many chatbot frameworks allow to embed tiles (rectangles with UI content) into the conversation flow to display content. This approach has the problem that the tile competes with the space of the conversation and scrolls up as the dialogue continues. These tiles are also limited to be small and provide at maximum a single click event instead of being a normal graphical UI with more interactivity and navigation to next level screens.

At activity 328, hybrid interface system 110 determines if the conversation has ended. When the conversation has not ended, hybrid interface system 110 waits to receive a follow-up input at activity 330. When the input is a response, the response is mapped for an intent at activity 332, and method 300 continues to activity 324, and the process repeats. Returning to activity 328, when hybrid interface system 110 determines the conversation has ended, method 300 of responding to requests using hybrid interface system 110 ends.

Figure 4:
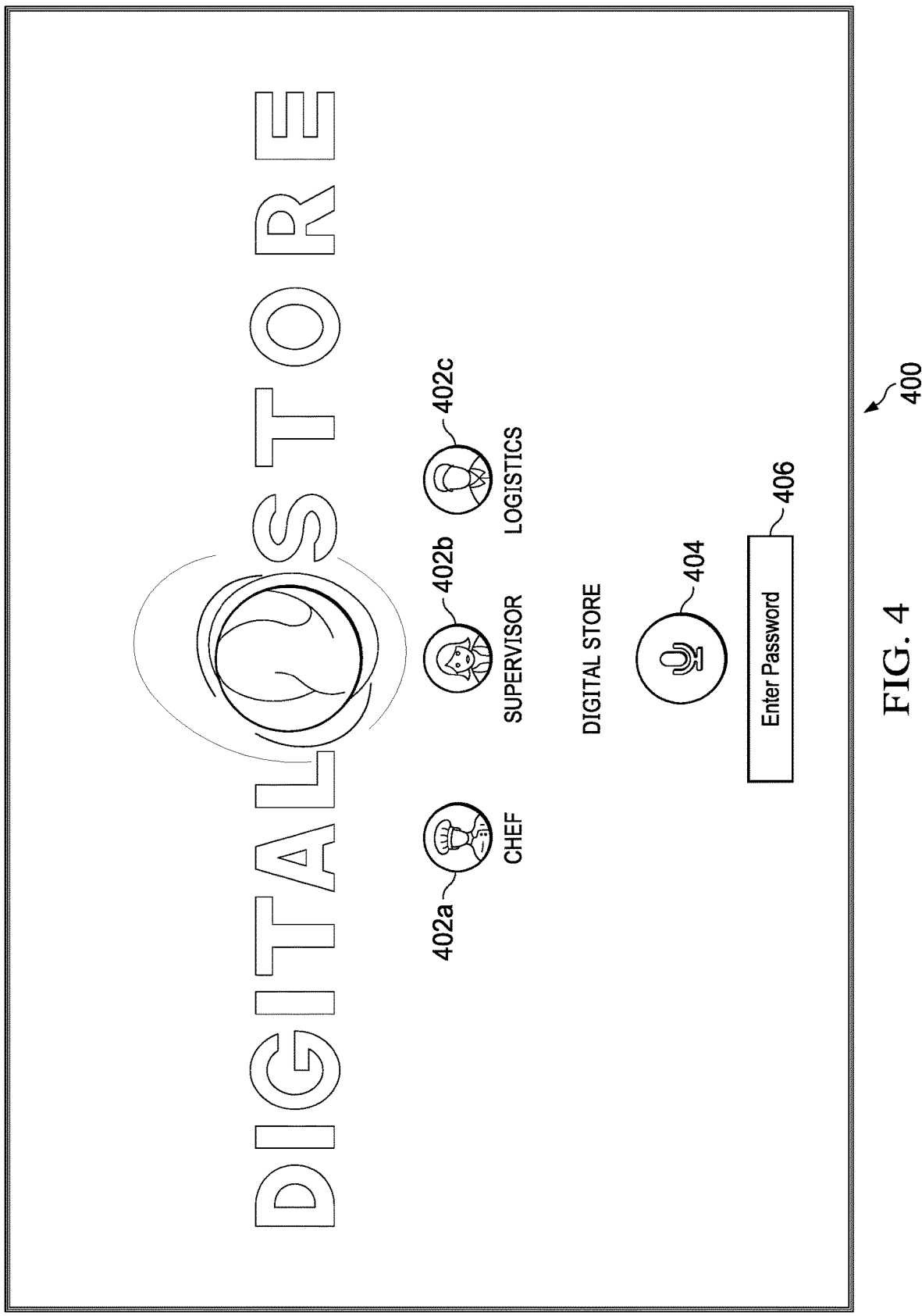
FIG. 4 illustrates a startup display of the hybrid interface system, in accordance with an embodiment.

FIG. 4 illustrates startup display 400 of hybrid interface system 110, in accordance with an embodiment. Startup display 400 provides selectable icons for three virtual assistants (virtual assistant icons 402a-402c), a microphone icon 404 to initiate a voice command, and a password entry box 406. Although selectable icons 402a-402c are shown for three virtual assistants (chef, supervisor, and logistics expert), embodiments contemplate, as disclosed above, creating virtual persona for other expertise areas, which are relevant to other verticals, domains 238, other users of one or more interactive display devices 120, any one or more supply chain entities 150, and/or the like.

Continuing with FIG. 4 and as disclosed above, a worker may access an instance of hybrid interface system 110 from one or more interactive display devices 120, such as, for example, a personal computer, a table device, a smart phone, or a mixed-reality headset. Hybrid interface system 110 displays informational graphical elements that provide information, context, structure, and aesthetics. The interactive graphical elements may comprise regions of the user interface that are monitored for selection or input by a user, such as, for example, buttons, drop down boxes, lists, input boxes, radio buttons, and the like. From startup display 400 hybrid interface system 110 may provide options to interact with different functionalities. By way of example only and not by way of limitation the following three examples are given:

FIGS. 5-8 illustrate a first example comprising a virtual workforce management and integration with workforce management system, in accordance with an embodiment.

FIGS. 9-20 illustrate inventory management of expiring food items and planning and executing alternative menu items when delivery of produce is disrupted, in accordance with an embodiment.

FIGS. 21-35 illustrate task completion by a worker receiving help from virtual assistant, in accordance with an embodiment.

1. Virtual Workforce Management and Integration with Workforce Management System.

Figure 5:
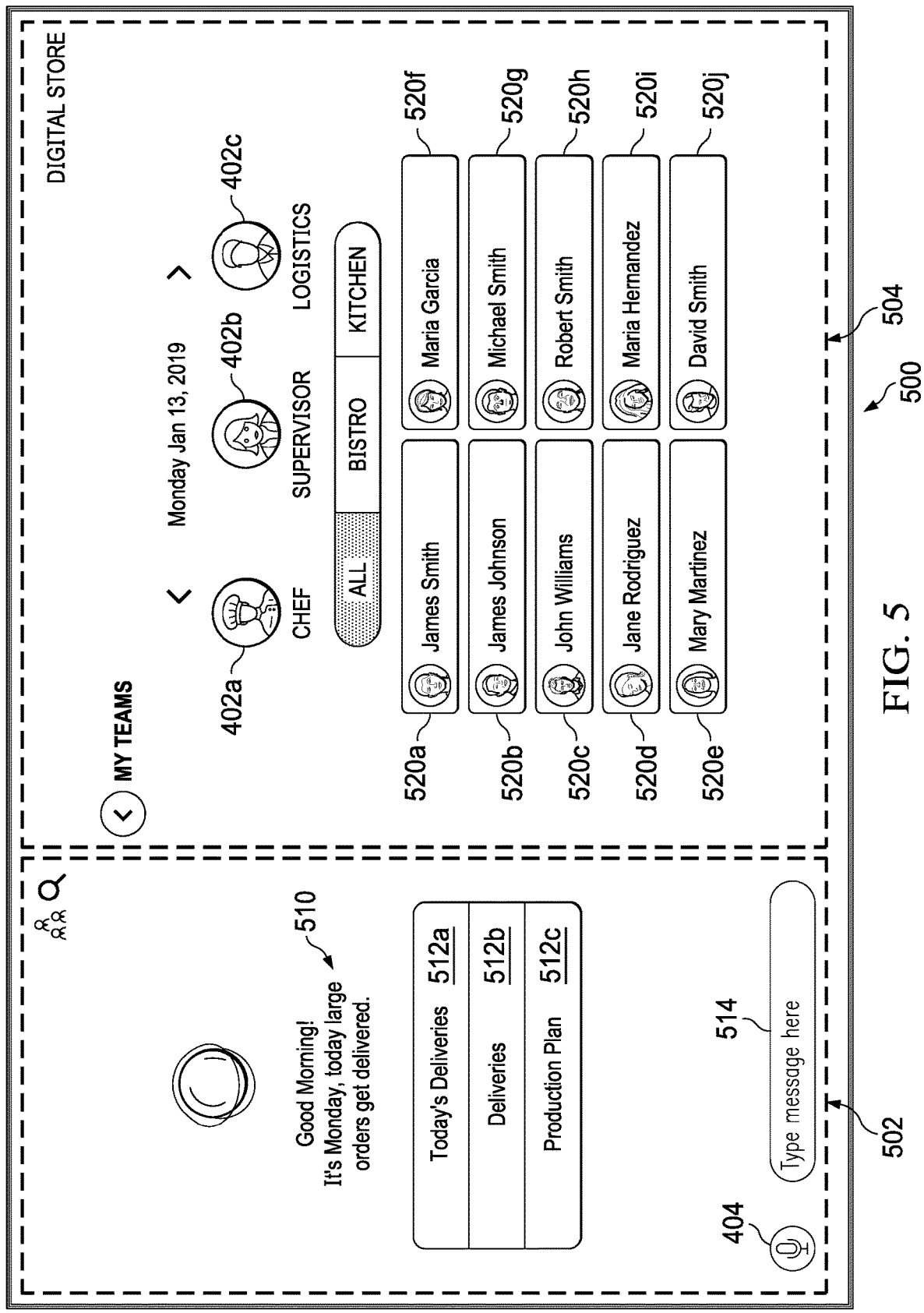
FIGS. 5-8 illustrate a first example comprising a virtual workforce management and integration with workforce management system, in accordance with an embodiment.

FIG. 5 illustrates virtual workforce overview 500, in accordance with an embodiment. Virtual workforce overview 500 comprises chatbot interface 502 and GUI interface 504. As disclosed above, one or more interactive display devices 120 update chatbot interface 502 and GUI interface 504 to display messages and graphics representing the answer to a question, lookup objects, offered choices, follow up actions, and/or the like. According to the illustrated embodiment, chatbot interface 502 provides text prompt 510, one or more selectable options 512a-512c, microphone icon 404 (as disclosed above), and response text entry box 514. GUI interface 504 comprises virtual assistant icons 402a-402c and selectable icons for each human member (human team-member icons 520a-520j) of a virtual workforce.

As described in further detail below, chatbot interface 502 displays a greeting ("Good Morning! It's Monday, today large orders get delivered.") followed by one or more selectable options 512a-512c: today's deliveries, deliveries, and production plan. In response to selection of one or more selectable options 512a-512c, hybrid interface system 110 updates chatbot interface 502 to display a message confirming the selection as well as update GUI interface 504 to display interactive graphics and text which, when selected, provide navigation to further information about each of one or more selected options 512a-512c or to take system actions regarding one or more selected options 512a-512c, according to particular needs.

Referring to GUI interface 504 of virtual workforce overview 500, in response to selection of virtual assistant icons 402a-402c and human team-member icons 520a-520j representing the virtual workforce members, GUI interface displays performance metrics of the virtual assistants and human members. In one embodiment, the human members of the virtual workforce comprise the workers listed in the same working group as the current user, such as, for example, the workers supervised by a particular worker or his or her co-workers. The virtual assistants assigned to the virtual workforce may comprise those assistants that provide information needed by a human member of the virtual workforce to complete one or more tasks.

In some embodiments, virtual persona system 100 provides a greater level of performance than a human manager by providing one-on-one guidance, illustrating each activity to perform a task, giving feedback, and being able to either respond directly to the workers questions, or transmitting the questions to a human expert who can directly reply to the worker via one or more interactive display devices 120. By way of explanation only and not by way of limitation, the roles of workers and virtual assistants may be ranked and organized hierarchically to define relationships among them. In some instances, the relationship provides for the virtual assistant to perform an assistant supervisor role by providing an intermediary between the worker and his or her supervisor. In other instances, the relationship provides for an expert to be reached directly from any worker, usually in response to the inability of the virtual assistant to provide a satisfactory response to the worker.

Workforce management system 130 may select the human members of the virtual workforce to fill only roles on which they have been previously trained. However, workforce management system 130 may assign a human worker to a virtual workforce group to perform a role that worker has not been trained on when the manager for that role is a virtual assistant having a performance level greater than a predetermined threshold. In addition, or as an alternative, when the tasks to be performed during a particular shift require no supervision or are easily performed by a worker with one or more interactive display devices 120, workforce management system 130 reduces the workforce to account for the unneeded supervisor.

Figure 6:
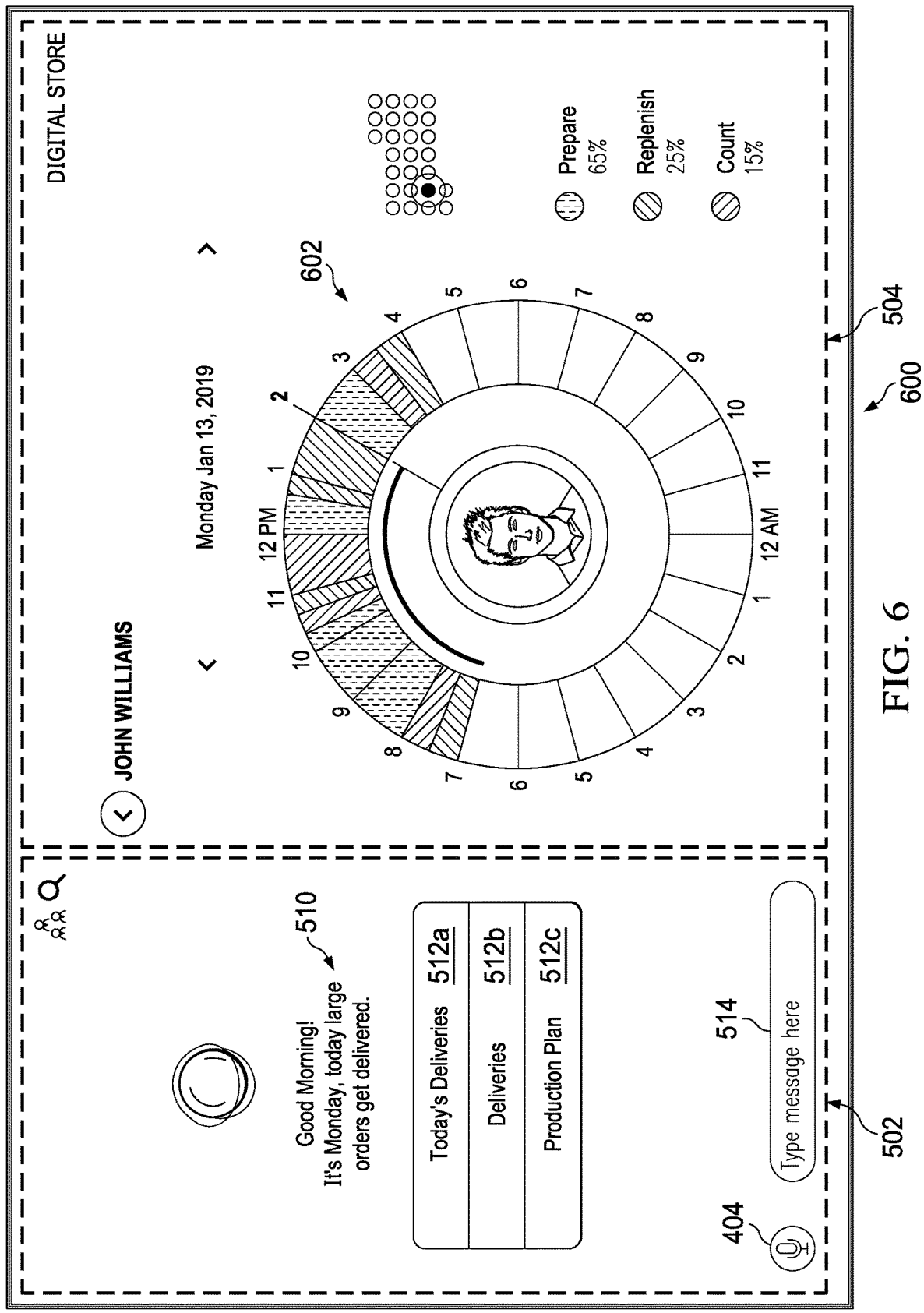

FIG. 6 illustrates human worker overview 600, in accordance with an embodiment. According to an embodiment, GUI interface 504 of worker overview 600 displays ring-shaped visualization 602 dividing a day into 24-segments. Segments worked by the worker are shaded, colored, patterned, or the like to indicate the time the worker performed action items from those tasks and/or the category of the task or action item. In this example, the worker, Hendrick Diede, worked from 7 am to 4 pm on Monday Jan. 13, 2019. Each of the segments having the same shading represent a particular task (or type of task) performed by this worker.

Figure 7:
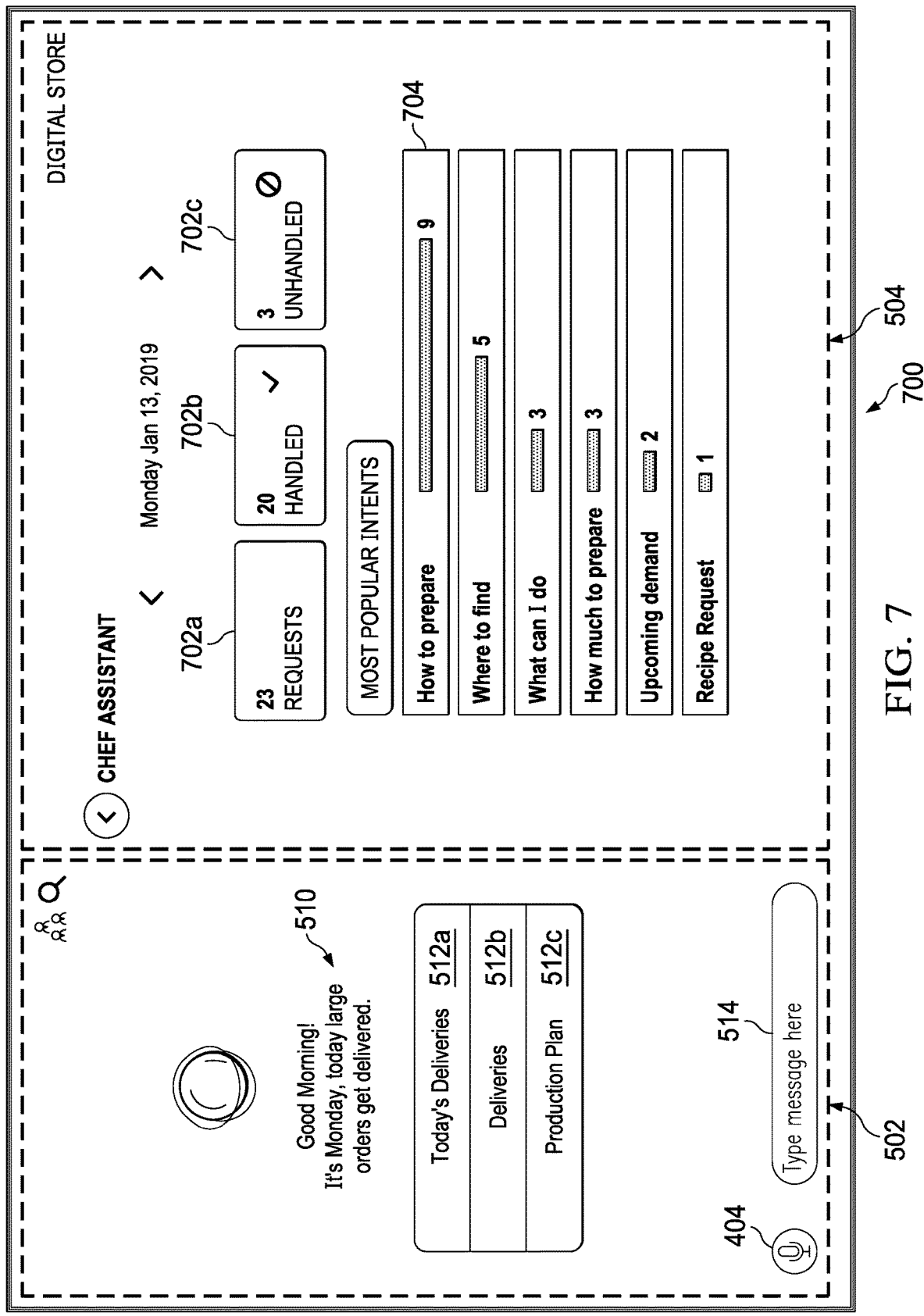

FIG. 7 illustrates virtual assistant overview 700, in accordance with an embodiment. In one embodiment, virtual assistant overview 700 displays metrics 702a-702c and list of intents 704 for requests handled by the displayed virtual assistant. According to one embodiment, metrics 702a-702c comprise the quantity of requests routed to the virtual assistant (requests 702a), the status of those requests (handled 702b) or unhandled (702c), and the quantity of intents 236 assigned to the requests (list of intents 704). In this example, the virtual chef assistant received twenty-three requests, handled twenty of the requests, and was unable to handle three. The two most common intents 236 of these worker requests were "how to prepare" (nine intents 236) and "where to find" (five intents 236). Virtual assistant overview 700 displays additional information regarding the unhandled requests. In response to selecting the "unhandled" graphic, virtual assistant overview 700 is updated to display the phrases not recognized by natural language processing system 224, as shown in further detail in FIG. 8.

Figure 8:
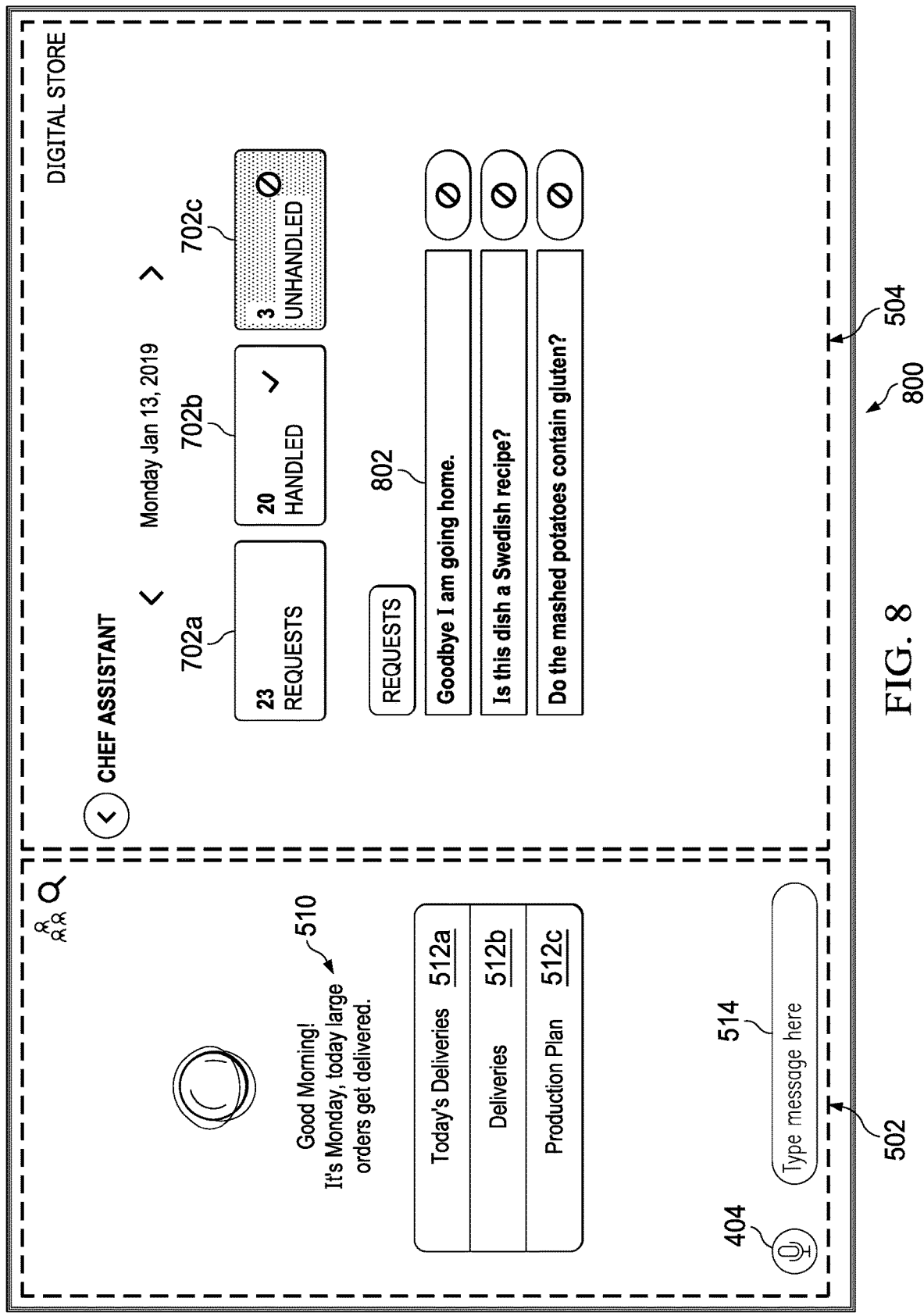

FIG. 8 illustrates virtual assistant overview 800, in accordance with a further embodiment. Virtual assistant overview 800 displays list of unhandled requests 802. Continuing with the virtual chef assistant example, natural language processing system 224 was unable to identify the intent for the phrases, "goodbye, I am going home." "Is this dish a Swedish recipe?" and "Do the mashed potatoes contain gluten?" Hybrid interface system 110 may create intents 236, parameters, context, responses, and the like for these unhandled requests so that these and similar requests may be handled in the future by natural language processing system 224. In addition, or as an alternative, a user with the same role as the virtual chef assistant may provide the answer in response to reviewing the unhandled requests. For example, the human chef may respond to the question "Do the mashed potatoes contain gluten?" with the appropriate answer to the worker who created the request.

2. Inventory Management of Expiring Food Items and Planning and Executing Alternative Menu Items when Delivery of Produce is Disrupted.

Figure 9:
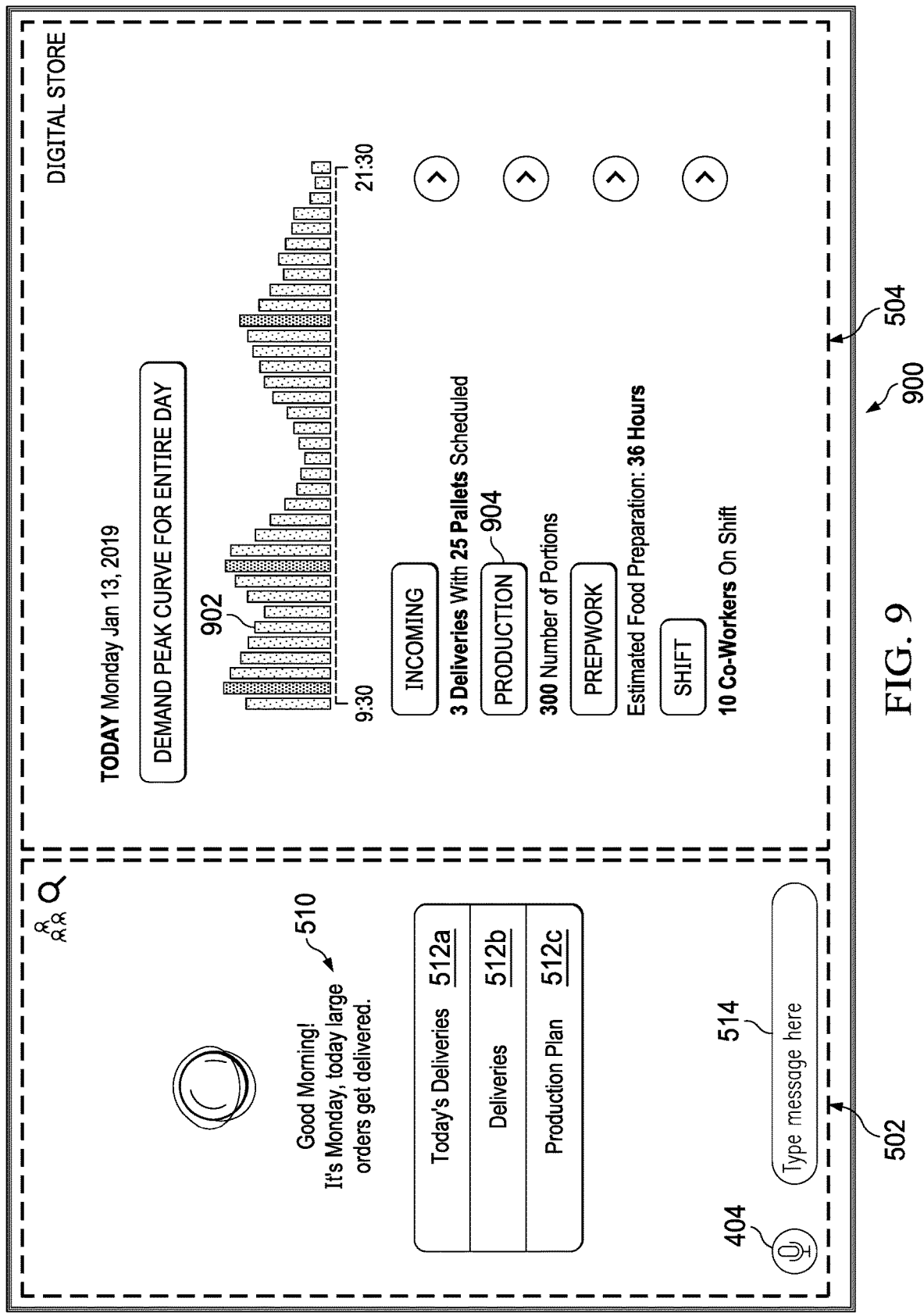
FIGS. 9-20 illustrate inventory management of expiring food items and planning and executing alternative menu items when delivery of produce is disrupted, in accordance with an embodiment.

FIG. 9 illustrates task and data dashboard 900, in accordance with an embodiment. Task and data dashboard 900 comprises one or more charts, graphs, text, or other visualizations providing information relevant to the role of the current user. Hybrid interface system 110 identifies tasks assigned to the role to determine the displayed information. Demand peak curve 902 is received from planning system 140. In one embodiment, hybrid interface system 110 is configured so that demand peak curve 902 displays only the forecasted demand relevant to the current user's role or assigned tasks. Similarly, delivery and quantity information 904 is selected for presentation is determined according to the tasks and role assigned to the user.

By way of example only and not by way of limitation, the following describes a user whom is a chef and whose tasks include overseeing the preparation of food for a cafeteria or bistro located within a retailer of one or more supply chain entities 150 by one or more kitchen workers. Continuing with this example, an assistant to the chef receives a demand forecast for a popular food item, a forecasted number of guests at the bistro or cafeteria, or the like.

As disclosed above, chatbot interface 502 provides text prompt 510, one or more selectable options 512a-512c, microphone icon 404, and response text entry box 514.

Figure 10:
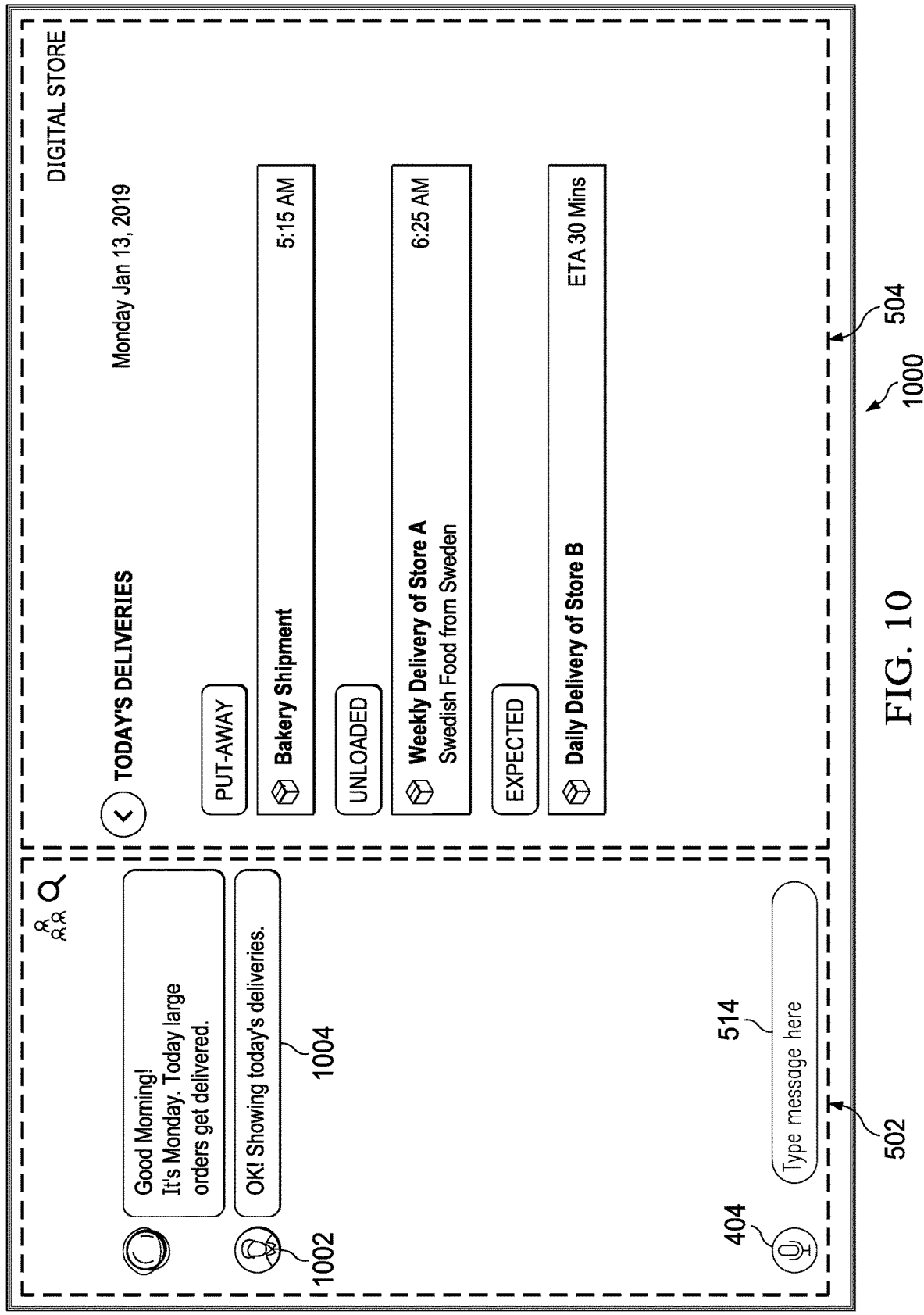

FIG. 10 illustrates delivery overview 1000, in accordance with an embodiment. In response to the user selection of "Today's Deliveries" by selectable option 512b of chatbot interface 502, the logistics expert virtual assistant 1002 replies with response 1004: "OK! Showing today's deliveries." Unlike a standalone chatbot interface that is limited to responding within the chat interface window, hybrid interface system 110 updates GUI interface 504 to provide interactive multi-level navigable interface elements. Not only does the dual nature of hybrid interface system 110 provide for tailoring the response to a user request according to the more efficient or easily understandable presentation, it also provides real-time collaboration between workers, supervisors, and subject-matter experts.

Figure 11:
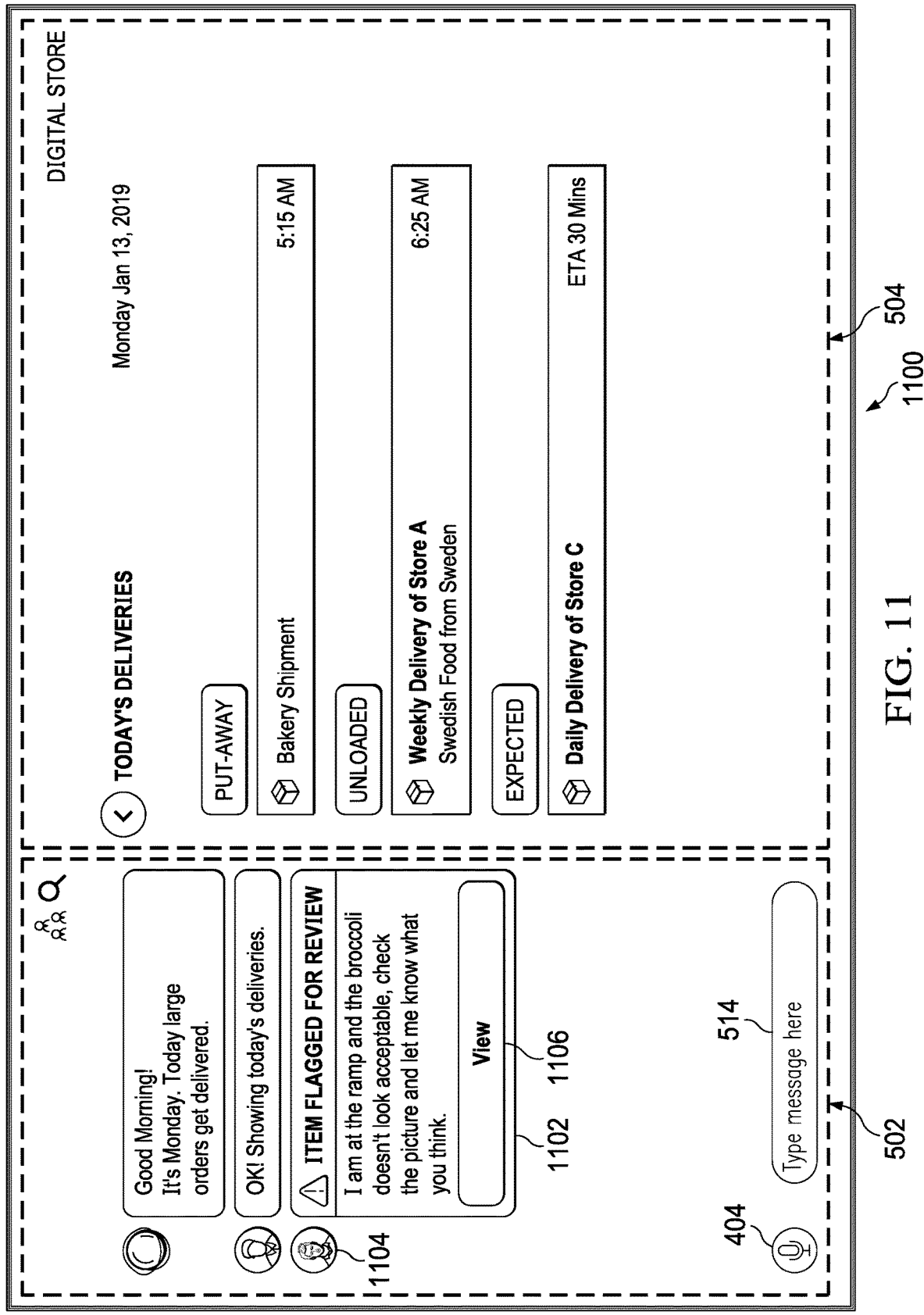

FIG. 11 illustrates delivery overview 1100, in accordance with an embodiment. While viewing the delivery overview, the user receives a message (flagged message 1102) from another worker 1104. Worker 1104 indicates that the delivered broccoli does not look acceptable, and worker 1104 would like the user to review a photograph and provide a second opinion, as shown in flagged message 1102 of chatbot interface 502. According to embodiments, flagged message 1102 comprises interactive view option 1106 that provides for user to respond to message. By way of example only and not by way of limitation, interactive view option 1106 provides for updating GUI interface 504 with viewing an item flagged for review.

Figure 12:
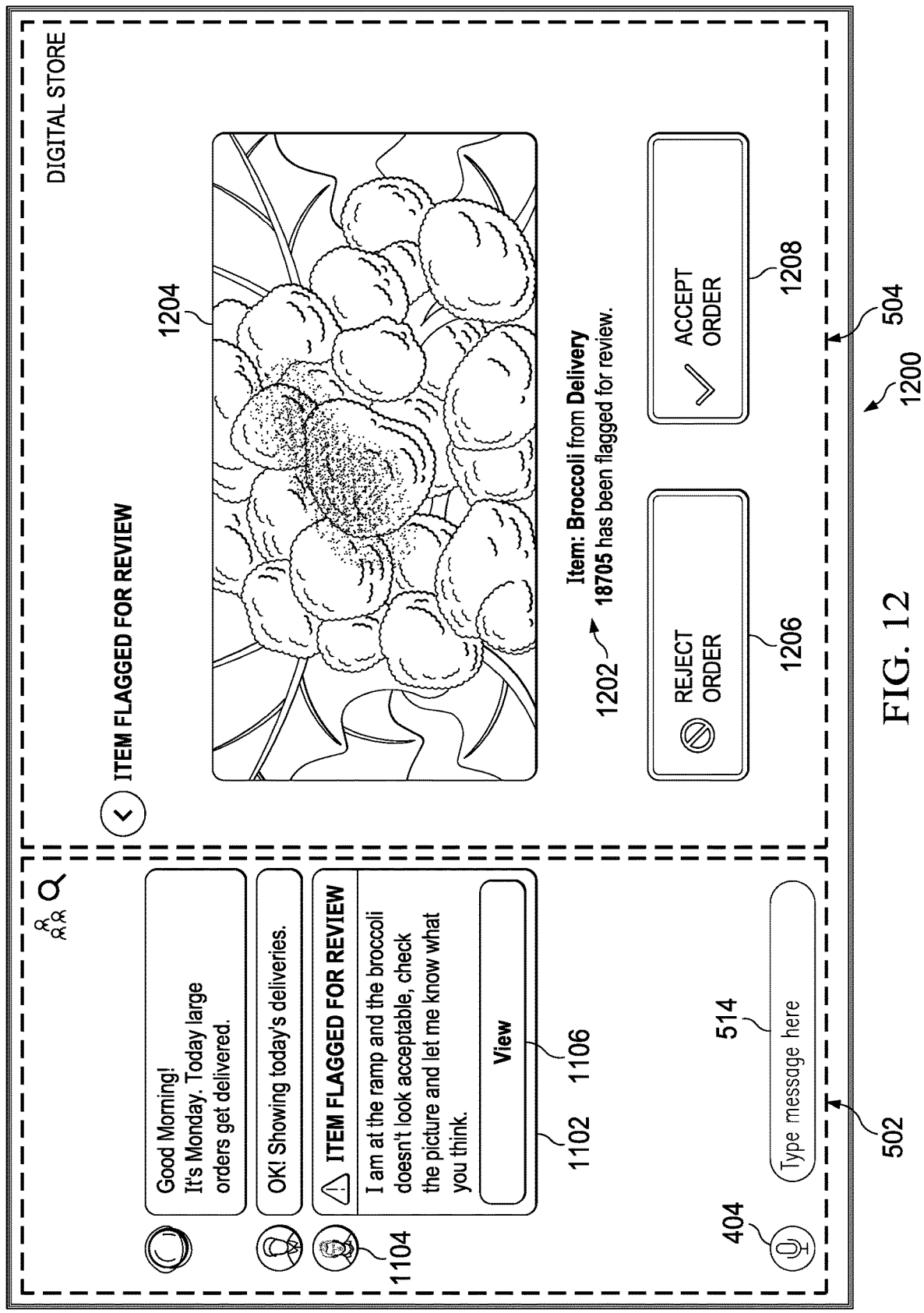

FIG. 12 illustrates flagged item review 1200 in accordance with an embodiment. In response to user selecting interactive view option 1106 from flagged message 1104, hybrid interface system 110 transmits and displays on GUI interface 504 message 1202 and photograph 1204. Message 1202 may comprise automatically populated information describing the item name and delivery number received from an inventory system. According to an embodiment, photograph 1204 is received from one or more sensors 206 of one or more interactive display devices 120 of worker 1004. In addition or as an alternative, photograph 1204 is received from one or more sensors 206 that are remotely located from and communicatively coupled with hybrid interface system 110 and transmitted by hybrid interface system 110 along with message 1202 in response to selection of interactive view option 1106. GUI interface 504 further comprises options to reject the item (reject order selection button 1206) or accept the item (accept order selection button 1208). Continuing with the example of the unacceptable broccoli flagged by worker 1104, GUI interface 504 displays photograph 1204 showing the flagged broccoli item and providing for the team leader to reject or accept the broccoli, in response to selection of reject order selection button 1206 or accept order selection button 1208, respectively.

Figure 13:
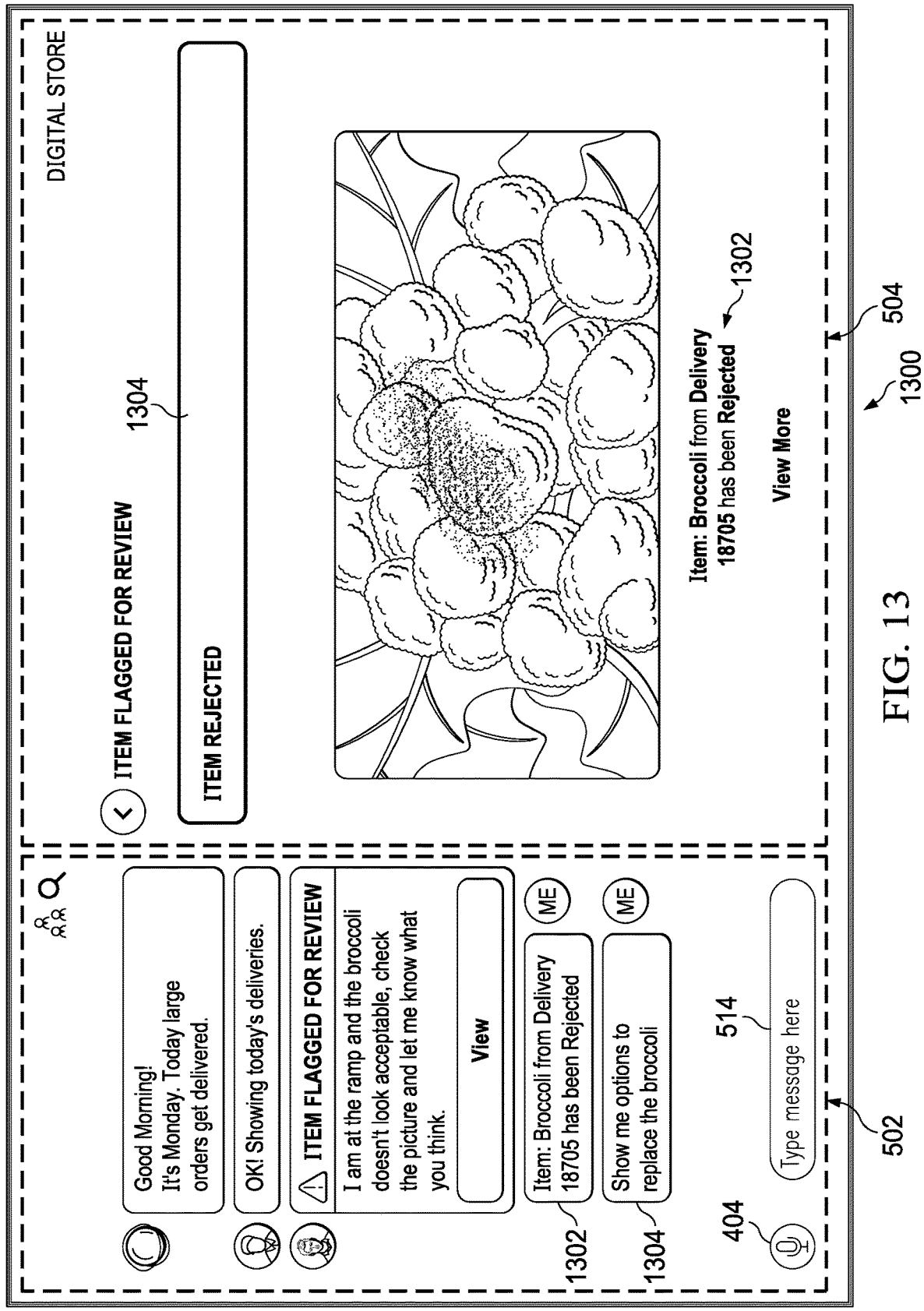

FIG. 13 illustrates flagged item rejection 1300, in accordance with an embodiment. In response to the user selection of the reject order selection button 1206, hybrid interface system 110 generates an automated message 1302 and item rejection notice 1304 for display by GUI interface 504. Continuing with the previous example, rejection message 1302 confirms that "Item: Broccoli from Delivery 18705 has been Rejected." and item rejection notice 1304 indicates that an item has been rejected. In addition, chatbot interface 502 is updated to display automated message 1302 as indicated by user selection of reject order selection button 1206 in GUI interface 504. Using a user input device (which may, according to some embodiments be initialized by microphone icon 404 or text entry box 514), chatbot interface 502 receives user message 1304. Continuing with the previous example, chatbot interface 402 receives user message 1304 comprising "Show me options to replace the broccoli." Although the user may request options to replace rejected food items, embodiments contemplate automatically creating a request for replacements in response to an order rejection to initialize the virtual assistant to immediately provide alternatives without input from the user. In one example, the process to initiate item replacement may comprise sending a message to natural language processing system 224 reading "Show me the options to replace [NAME OF REJECTED ITEM]", which will assign an intent indicating to assign the virtual chef assistant to respond to the request with alternative or substitute menu items.

Figure 14:
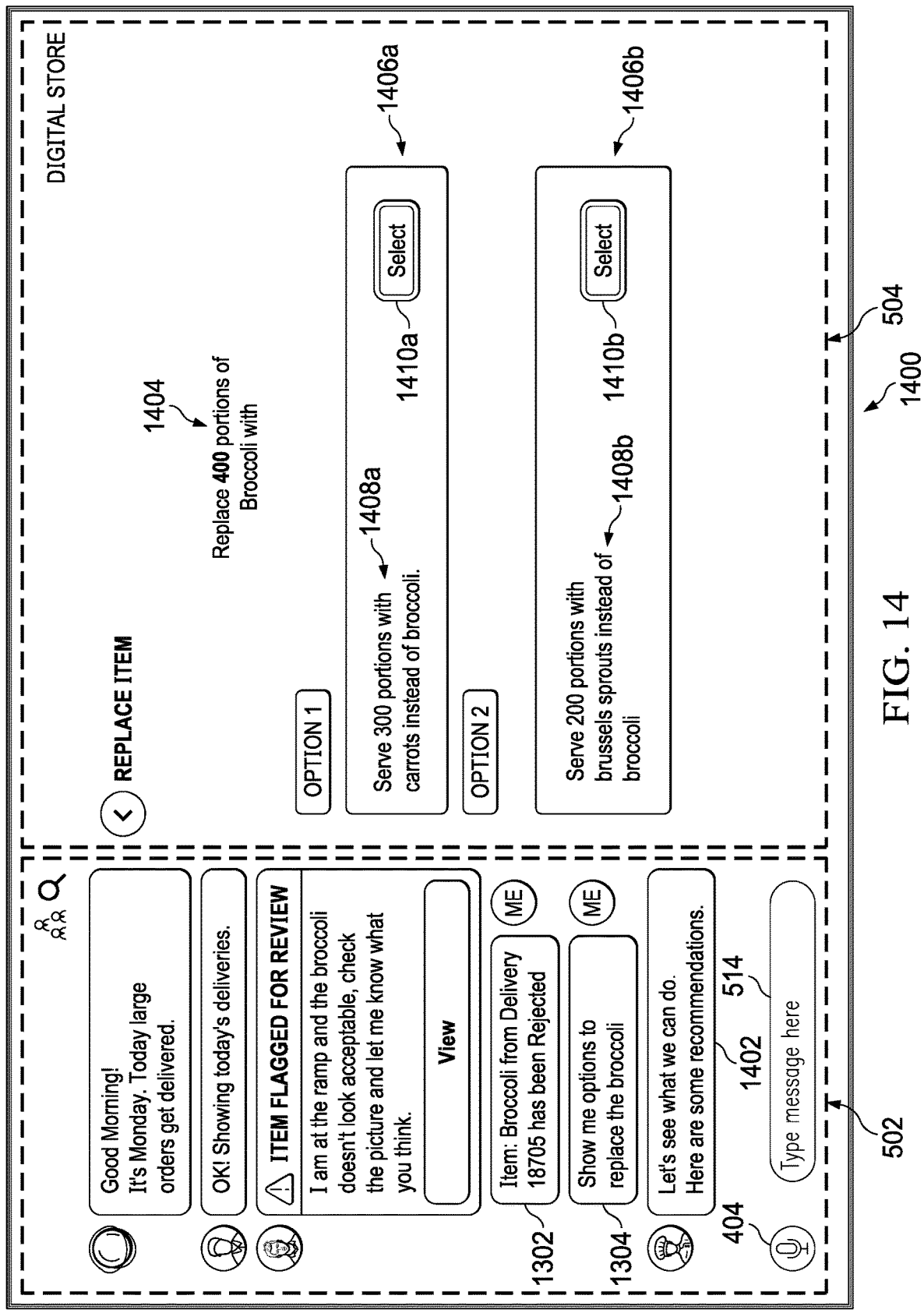

FIG. 14 illustrates alternate item suggestion 1400, in accordance with an embodiment. Although the logistics supervisor was the initial virtual assistant helping the user during this chat session, the delivery rejection automatically initiates the virtual chef assistant to respond to the delivery order rejection. Response 1402 of chatbot interface 502 indicates that the chef virtual assistant will provide recommendations to replace the rejected item in GUI interface 504. GUI interface 504 of alternate item suggestion 1400 comprises replacement message 1404 and options 1406a-

1406b. Replacement message 1404 indicates that the rejected item comprises 400 portions of broccoli and automatically suggests options 1406a-1406b comprising suitable replacements for the rejected item. According to embodiments, the virtual chef assistant suggests alternative menu items comprising two options to replace the rejected broccoli: first option 1406a comprising 300 portions of carrots as indicated by first option description 1408a or second option 1406b comprising 200 portions of Brussels sprouts as indicated by second option description 1408b. Either options 1406a-1406b may be selected by choosing the corresponding option selection buttons 1410a-1410b. Continuing with the previous example of selection a replacement menu item for the rejected broccoli, the user requests for an alternative having 200 carrots and 200 Brussels sprouts instead of selecting either of the displayed options.

Figure 15:
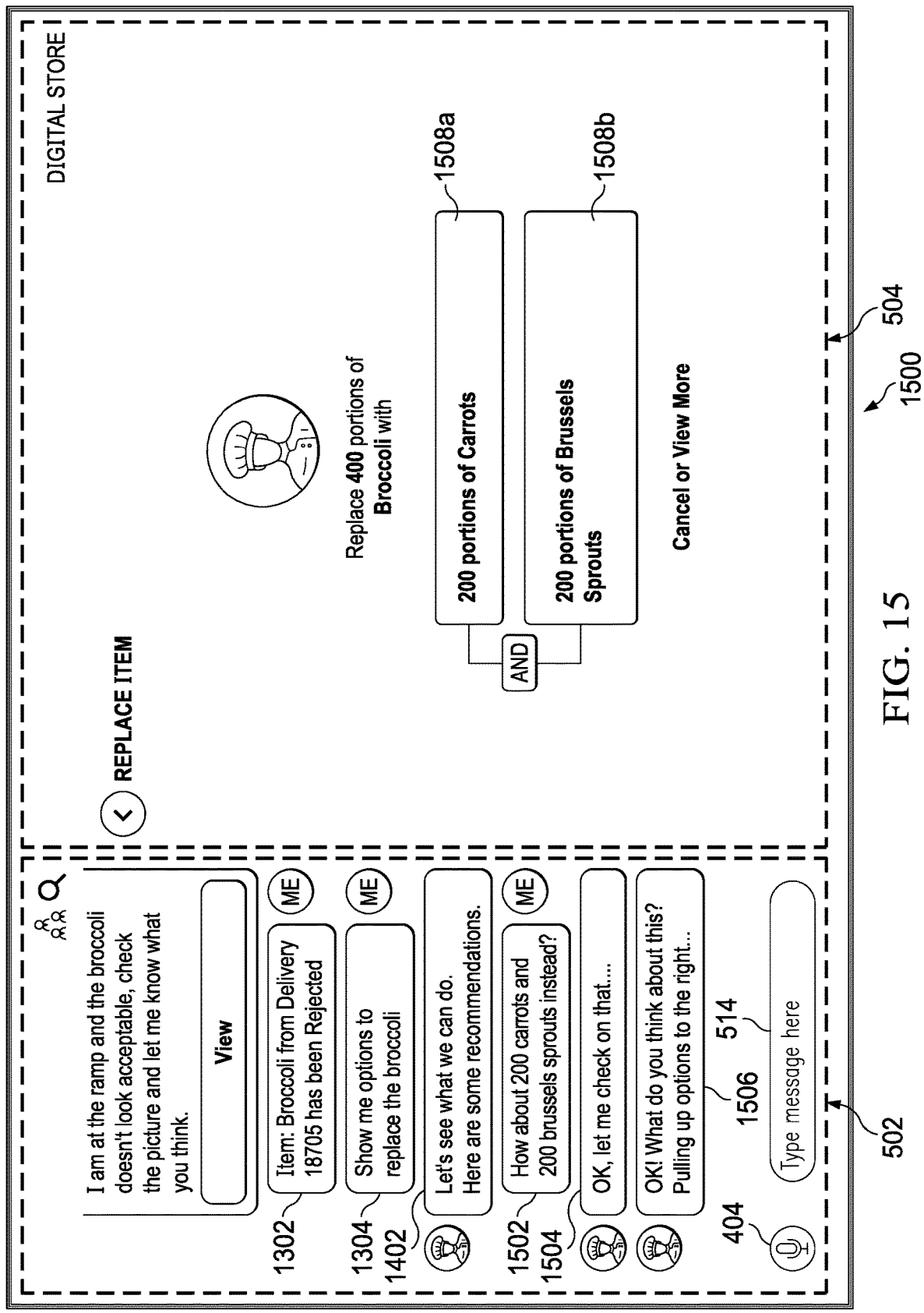

FIG. 15 illustrates alternate menu item selection 1500, in accordance with a further embodiment. Using a user input device (which may, according to some embodiments be initialized by microphone icon 404 or text entry box 514), chatbot interface 502 receives user message 1502 requesting an alternative having 200 carrots and 200 Brussels sprouts, as disclosed above. In response, the virtual chef assistant suggests the alternate menu item requested by the user. Hybrid interface system 110 indicates the alternate menu item by updating chatbot interface 502 with response message 1504 (displayed while hybrid interface system 110 uses natural language processing system 228 to understand user input, access inventory and menu data to determine suitability of request, or one or more other system interactions, according to particular needs) and response message 1506 (displayed to direct user attention to GUI interface 504). Hybrid interface system 110 updates GUI interface 504 with alternate menu item descriptions 1508a-1508b which describe the alternate menu item(s) referred to by chatbot interface 502. Continuing with the example disclosed above, alternate menu item descriptions 1508a-1508b indicate that the rejected broccoli is being replaced with the substitution of carrots and Brussels sprouts as requested by the user. As disclosed above, the combination of chatbot interface 502 and GUI interface 504 provides for more quickly resolving problems, receiving information, and the like, based on the dual features of natural language interactivity and the large interactive visual space to immediately flag problems, receive possible solutions, view larger details or drill down into finer detail, and then implement the solution by assigning a task to one or more workers to implement the chosen resolution.

In addition to reviewing deliveries, the user may check current inventories.

Figure 16:
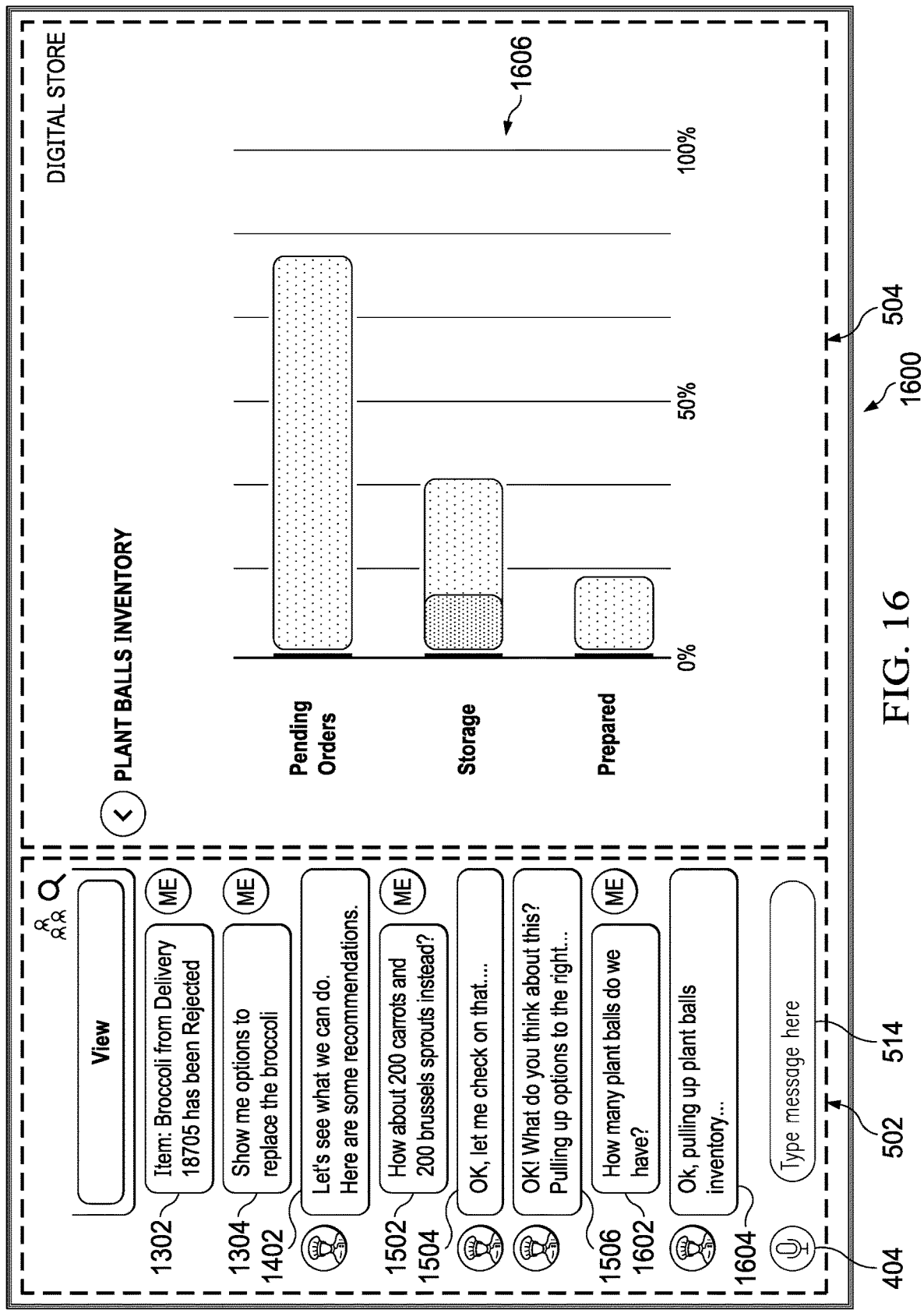

FIG. 16 illustrates food item inventory overview 1600, in accordance with an embodiment. According to embodiments, hybrid interface system 110 generates and displays user-requested information about the inventory of a particular food item. As disclosed herein, embodiments contemplate supply chain planner 140 comprises an inventory system having inventory data 286 and inventory policies 288 for planning the receipt, storage, and delivery of items at one or more stocking locations of one or more supply chain entities 150. Embodiments of hybrid interface system 110 comprise virtual assistants that interface with an inventory system and provide textual and visual feedback using chatbot interface 502 and GUI interface 504, as described in further detail below. By way of example only and not by way of limitation, the virtual chef assistant provides textual feedback indicating the current inventory for a food item (plant balls). Continuing with this example, virtual chef assistant receives a user message 1602 inquiring about the quantity of plant balls, and, in response, virtual chef assistant displays response 1604 in chatbot interface 502 and chart 1606 in GUI interface 504.

Figure 17:
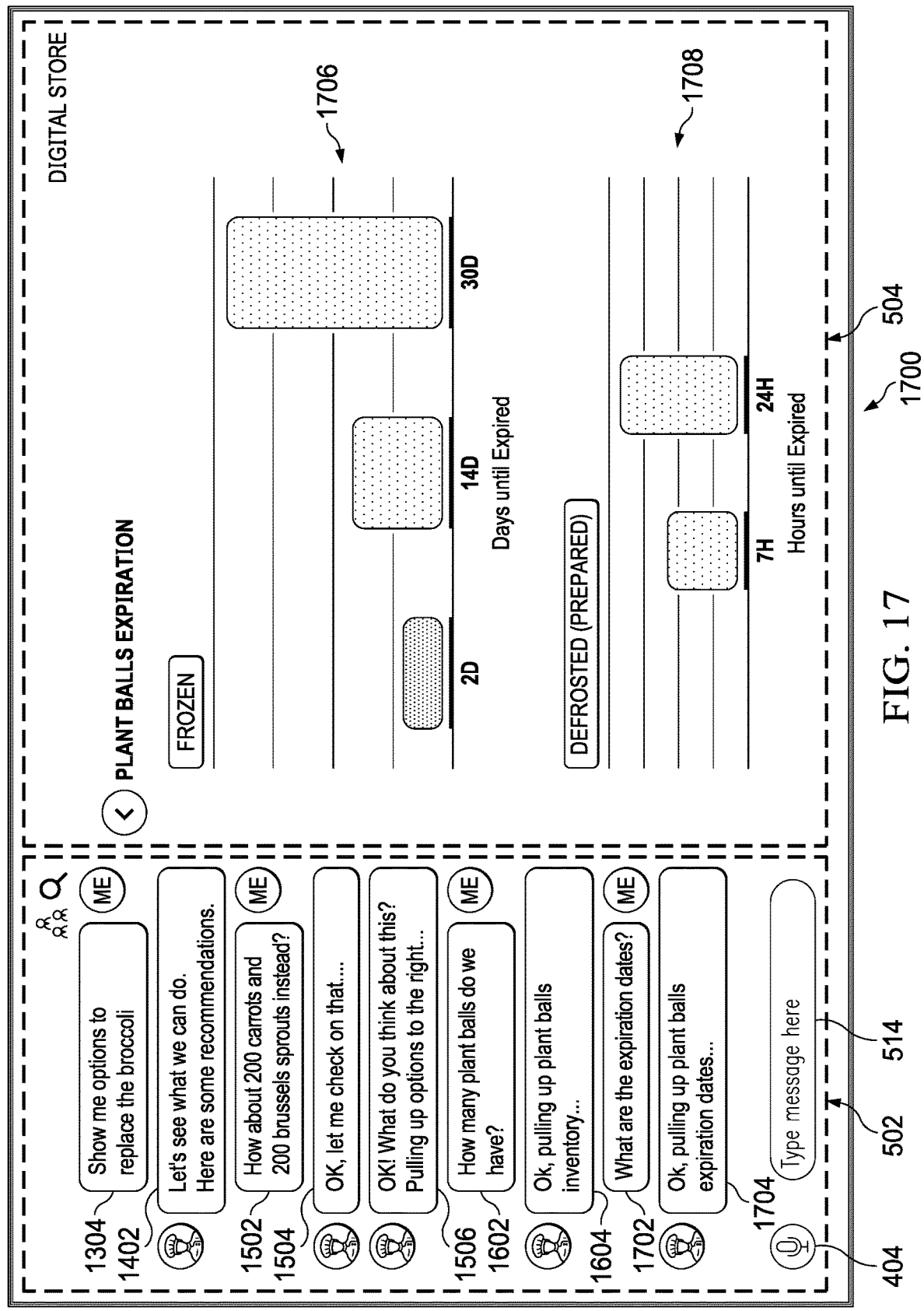

FIG. 17 illustrates food item expiration visualization 1700, in accordance with an embodiment. Continuing with the previous example, after the reviewing the current inventory, the virtual chef assistant responds to a user request 1702 to provide the expiration of the plant balls. In response to the user request comprising "What are the expiration dates?", natural language processing system 224 relies on the context of the request to determine that the user is requesting the expiration dates of the plant balls and responds by providing virtual chef assistant response 1704 and updating GUI display with expiration charts 1706-1708. According to embodiments, hybrid interface system 110 accesses supply chain planner 140 comprising inventory management system for information regarding the current location and quantities of inventory items, including the projected or calculated expiration date for the items. In the current example, expirations chart 1706 indicates the projected expiration for frozen plant balls and expiration chart 1708 indicates the calculated expiration for prepared/defrosted plants balls, according to an embodiment.

Figure 18:
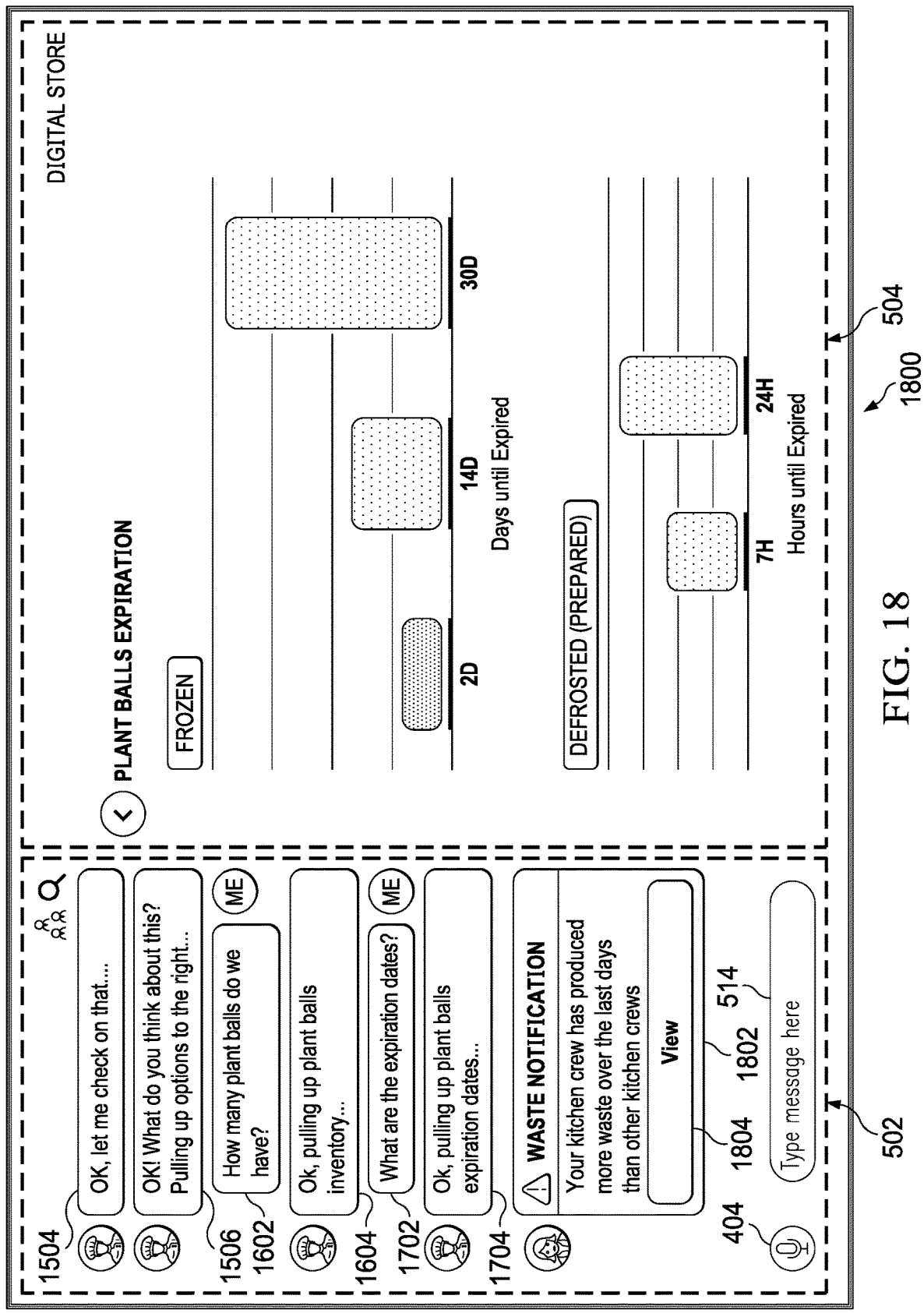

FIG. 18 illustrates waste notification 1800, in accordance with an embodiment. While viewing the expiration dates, the supervisor virtual agent provides interactive waste notification message 1802. Interactive waste notification 1802 comprises view selection button 1804. Continuing with the previous example, chatbot interface 502 displays interactive waste notification 1802 indicating that the kitchen crew has produced more waste than other kitchen crews. In addition, the user may select view selection button 1804 from chatbot interface 502 to display further information regarding the waste.

Figure 19:
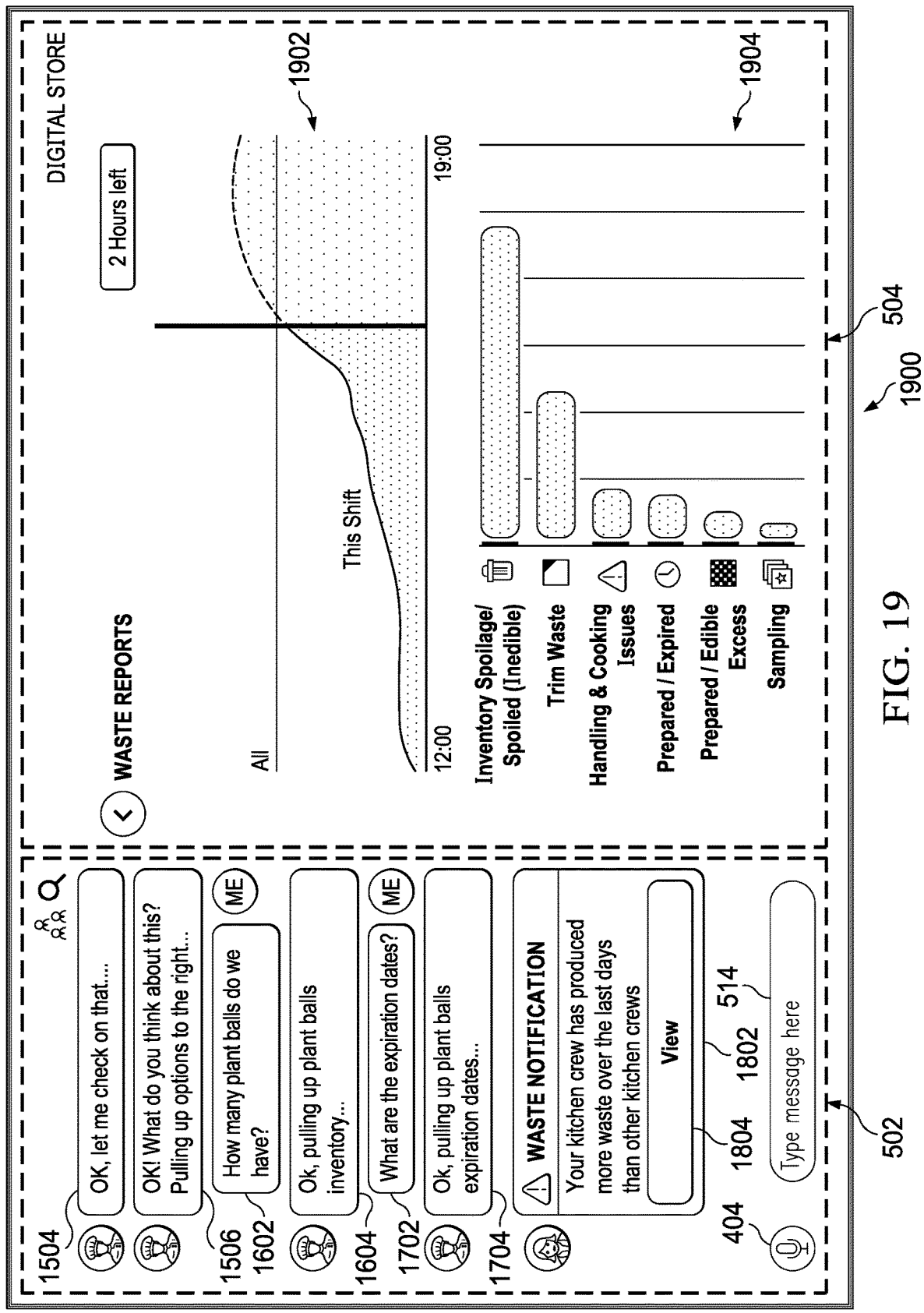

FIG. 19 illustrates waste report overview 1900, in accordance with an embodiment. Waste report overview 1900 comprises chart 1902 and waste breakdown 1904. Continuing with the previous example, waste report overview 1900 indicates a comparison of this kitchen crew with others of the enterprise. In addition, the supervisor virtual assistant provides waste breakdown 1904 indicating reasons for the extra waste, which, in this example, is caused by inventory spoilage and trim waste.

Figure 20:
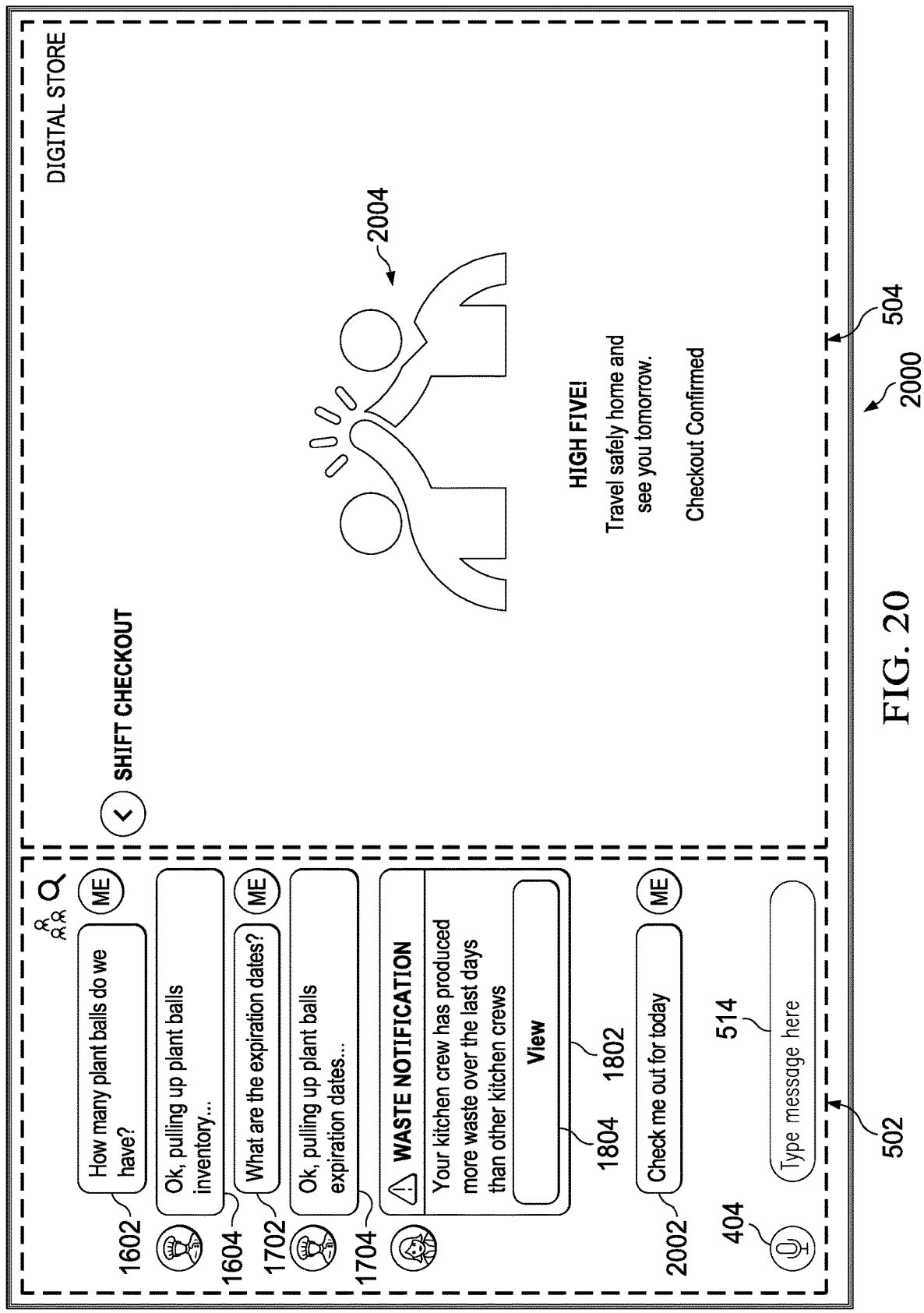

FIG. 20 illustrates checkout confirmation 2000, in accordance with an embodiment. After reviewing the waste report, the user provides voice input 2002 to check out for the day as displayed on chatbot interface 502. In response to assigning an intent to the user's voice input 2002 to check out for the day, hybrid interface system 110 may transmit and/or natural language processing system 224 may make an entry of the clock out time for this user and display an indication 2004 confirming checkout for the user on GUI interface 504.

3. Task Completion by a Worker Receiving Help from Virtual Assistant.

Figure 21:
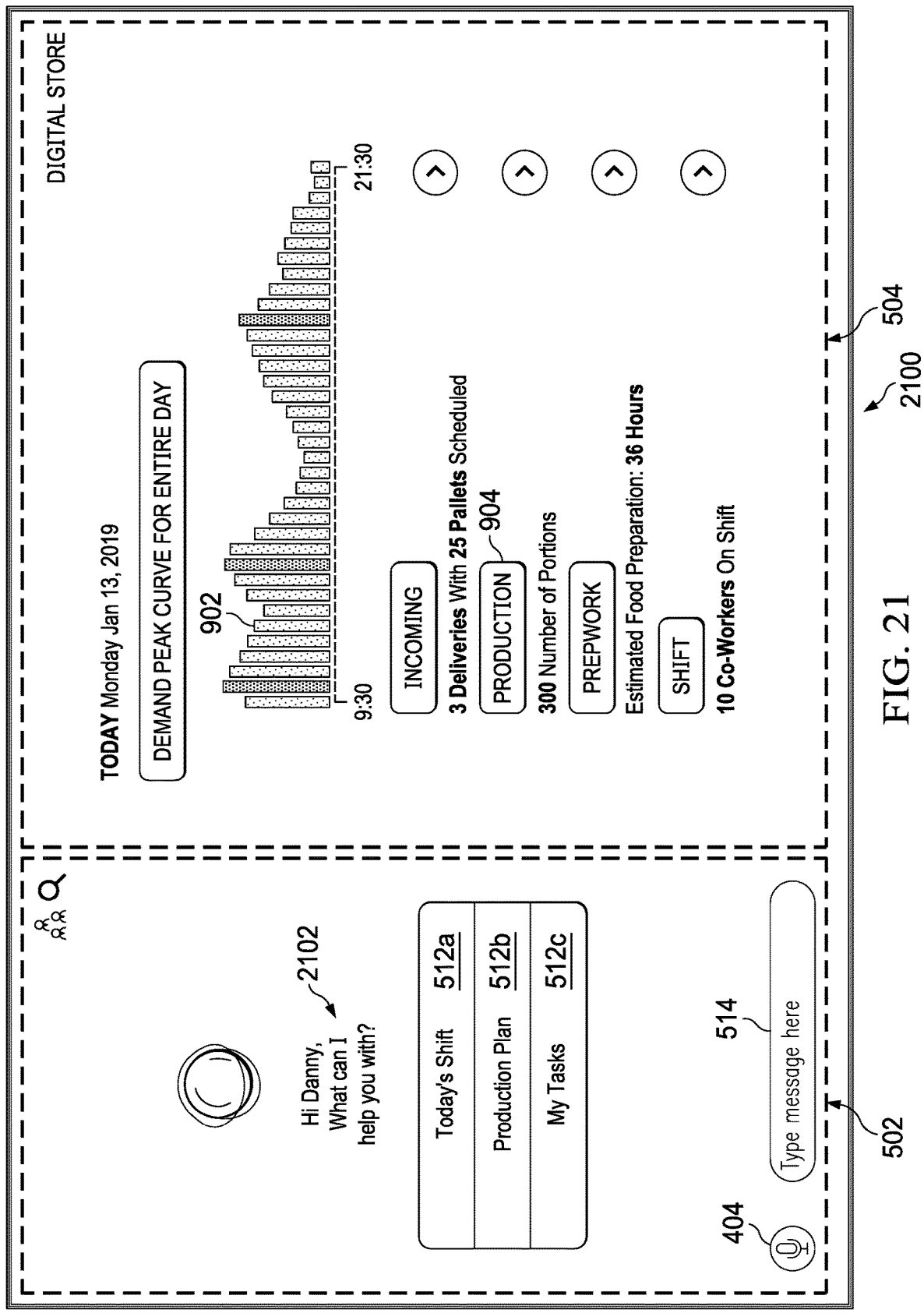
FIGS. 21-35 illustrate task completion by a worker receiving help from virtual assistant, in accordance with an embodiment.

FIG. 21 illustrates worker home screen 2100, in accordance with an embodiment. Worker home screen 2100 comprises chatbot interface 502 and GUI interface 504. Chatbot interface 502 comprises welcome message 2102 generated by the virtual assistant to the worker using the one or more interactive display devices 120 displaying the hybrid interface generated by hybrid interface system 110. As disclosed above, hybrid interface system 110 worker home screen comprises chatbot interface 502 providing three selectable options 512a-512c from which the worker may choose: Today's Shifts, Production Plan, and My Tasks;

GUI interface 504 displays demand peak curve 902 as well as delivery and quantity information 904. Also as disclosed above, GUI interface 504 displays demand peak curve 902 comprising times of predicted high demand for the day and delivery and quantity information 904 indication incoming deliveries, a quantity of food portions to prepare, an estimated food preparation time, and the quantity of co-workers currently on-shift. By way of example only and not by way of limitation, the current user of the illustrated embodiment is shown and described as a kitchen worker that is supervised by the chef, who was the user in the previously described example, above. Hybrid interface system 110 determines the role of the user is a kitchen worker, and updates the graphics and text of display of one or more interactive display devices 120 to provide those assigned to the role of the kitchen helper, some of which may the same and some of which may be different, from those displayed for the chef.

As disclosed above, the user may interact with the initial selections from chatbot interface 502 using touch inputs, voice inputs (such as by microphone icon 404 that initiates and provides for receiving a voice input or speech sample from user input device), or text entry input using text input entry box 514. Continuing with the illustrated example, in response to selection of second selectable option 512*b* ("Production Plan"), hybrid interface system 110 updates the displayed visualizations to display the production plan associated with a task to be completed by the worker.

Figure 22:
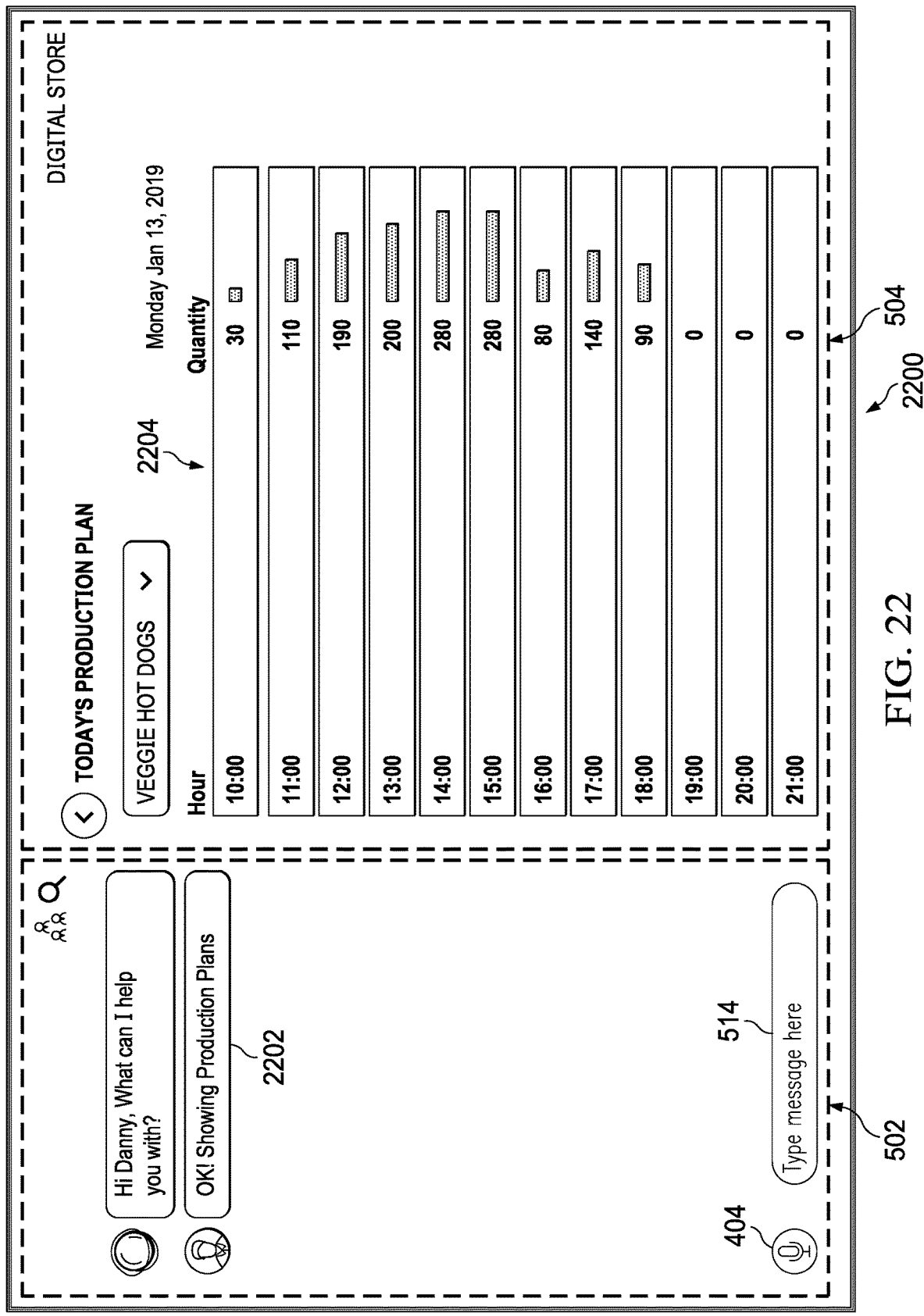

FIG. 22 illustrates production plan overview 2200, in accordance with an embodiment. in response to receiving a user input comprising selection of second selectable option 512*b* ("Production Plan") from a set of options displayed by the display device, hybrid interface system 110 generates dialogue representing the selection in chatbot interface 502 (response 2202 from virtual logistics assistant) and updates GUI interface 504 to display production plan 2204. In the example of the illustrated embodiment, production plan 2202 indicates the quantity of veggie hot dogs to prepare at each hour from 10:00 a.m. to 6:00 p.m. on Monday Jan. 13, 2019.

Continuing with the example, the worker, after reviewing the production plan, determines veggie hot dog preparation does not yet need to be started and requests if additional tasks may be completed in the meantime.

Figure 23:
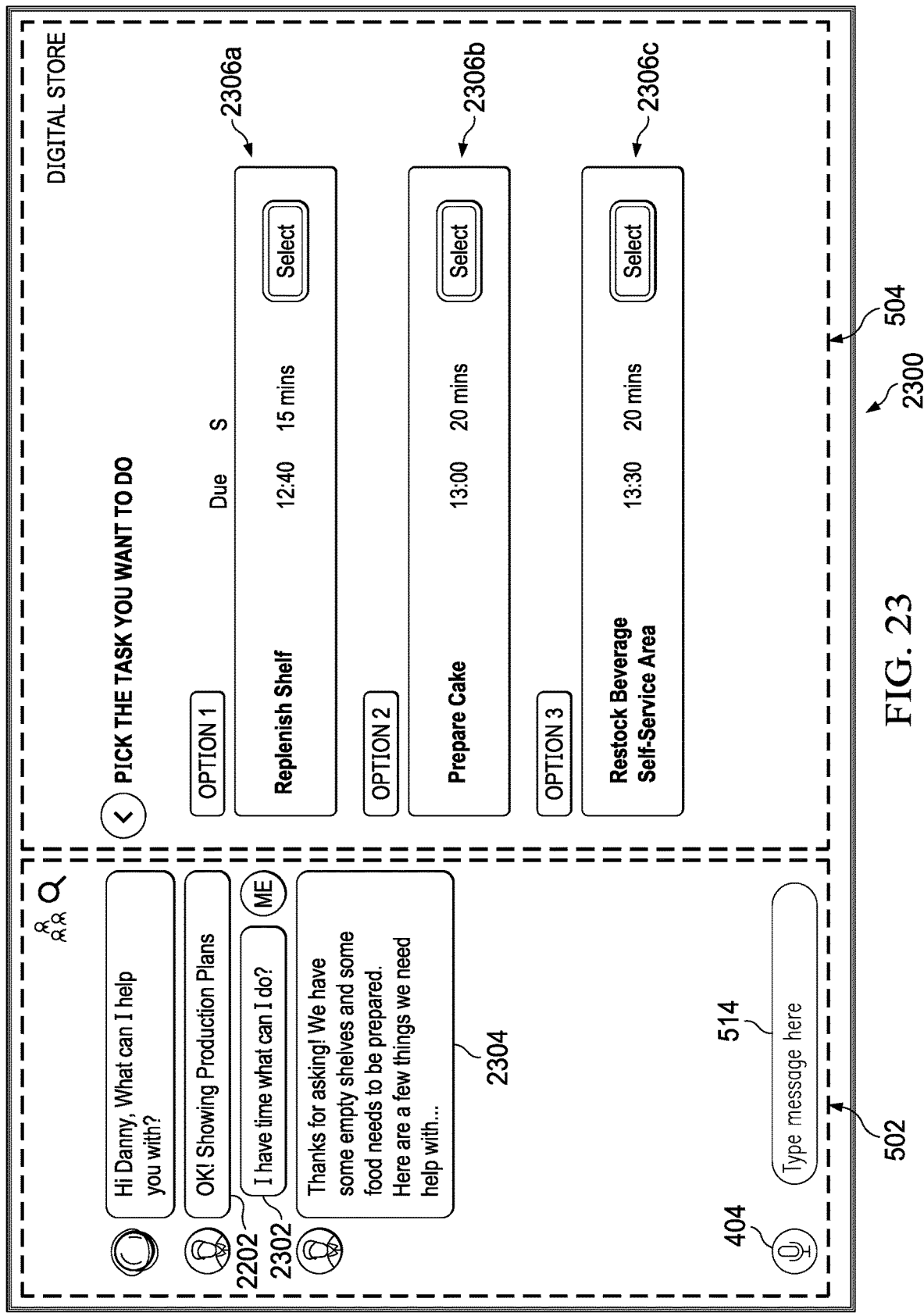

FIG. 23 illustrates task option selection 2300, in accordance with an embodiment. In response to the worker's request 2302 for additional tasks, the logistics expert provides response 2304 in chatbot interface 502 three selectable options 2306*a*-2306*c* indicating a deadline and completion time for three tasks. In response to selecting one of selectable options 2306*a*-2306*c*, hybrid interface system 110 launches a step-by-step walkthrough of the activities needed to perform the task associated with the selected option.

The following FIGS. 24-27 illustrate performing individual activities to prepare a cake for serving in a bistro or cafeteria of one or more supply chain entities 150. To perform these activities, a worker may follow along and select "next" when an activity is completed, "back" when the user needs to return to a previous activity, or ask for help, when the user cannot determine the proper way to complete the activity.

Figure 24:
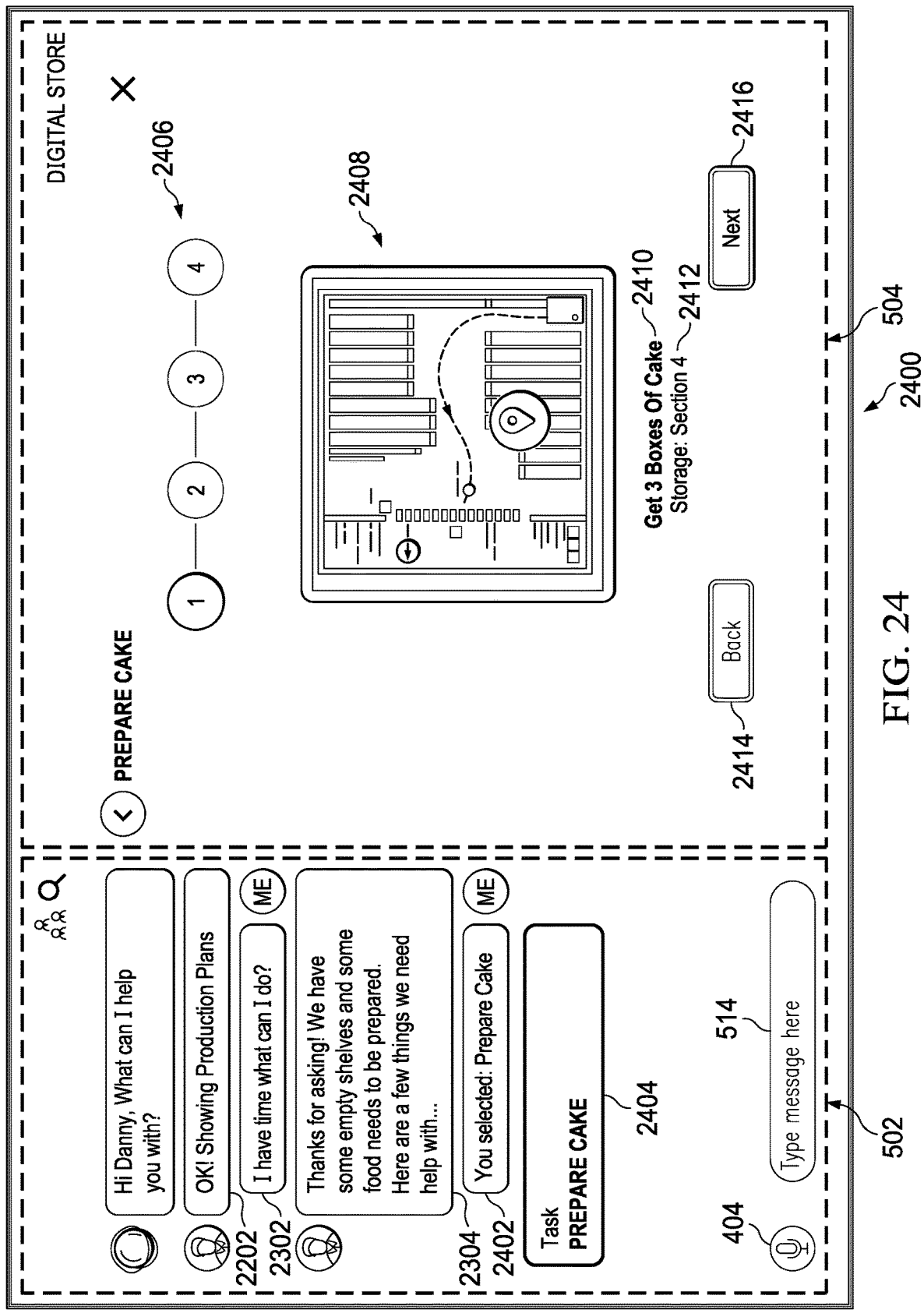

FIG. 24 illustrates first action item 2400 of a cake preparation task, in accordance with an embodiment. Chatbot interface 502 indicates that the user has selected prepare cake task with confirmation response 2402 and task indicator 2404. GUI interface 504 indicates the current task using task completion status bar 2406, a map 2408 showing where activity is to be completed, instructions 2410, item location 2412, backward navigation button 2414, and forward navigation button 2416. Continuing with the current example of the task of preparing a cake, the first action item indicated by task completion status bar 2406 comprises a mapping of a location of a required item to store map 2408 displayed on one or more interactive display devices 120 with instructions 2410 showing the number of items to retrieve (three boxes of cake) and the location of the cake (item location 2412). In response to user completion of the task or user selection of forward navigation button 2416 ("Next"), hybrid interface system 110 continues to the following activity of the cake preparation task.

Figure 25:
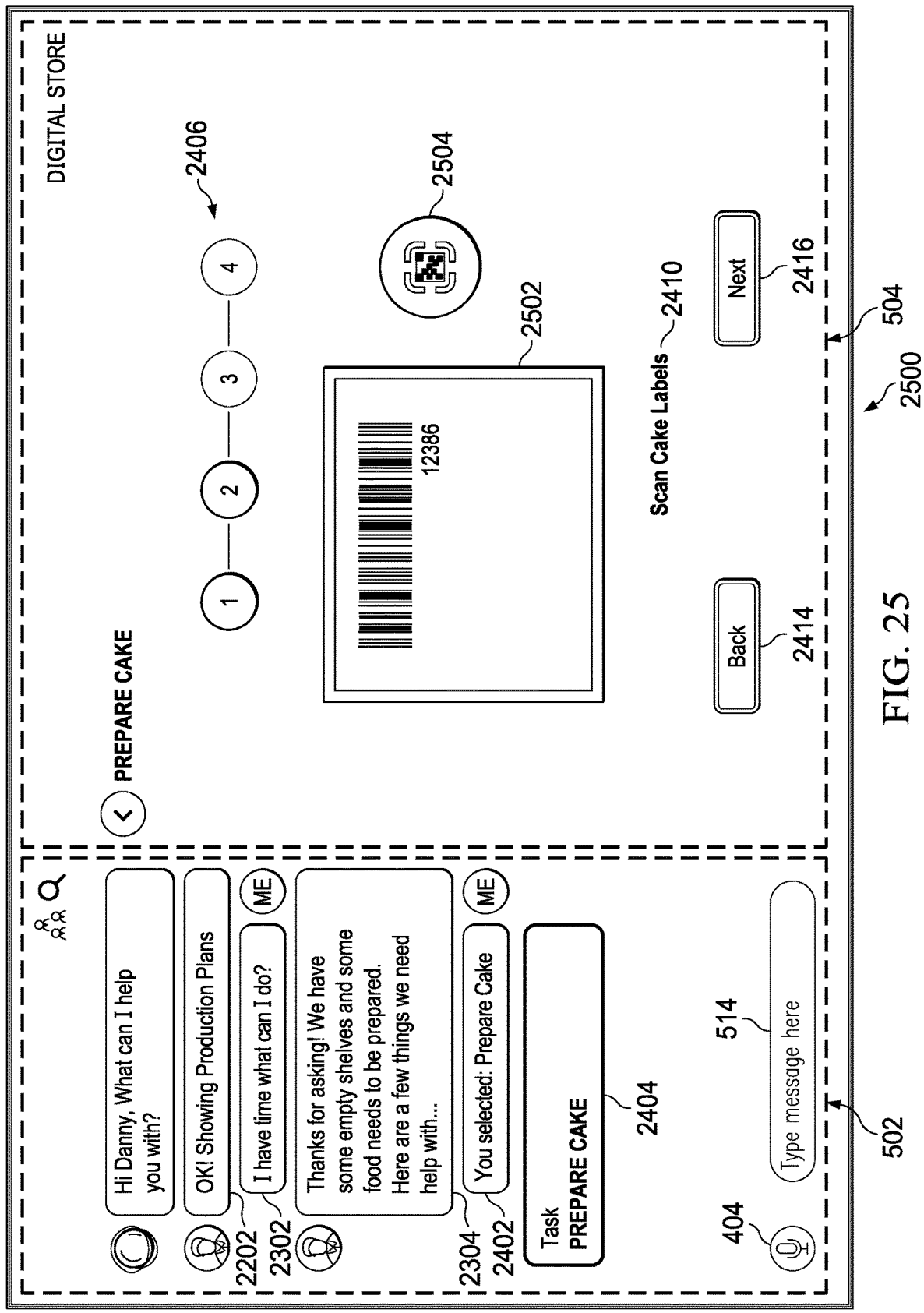

FIG. 25 illustrates second action item 2500 of a cake preparation task, in accordance with an embodiment. Instructions 2410 are updated to instruct the worker to use a bar code scanner of one or more interactive display devices 120 to scan the label associated with the cakes. Scanning is shown in viewing window 2502 and initiated by scan initiation button 2504. In response to user scanning of the correct bar code of the labels of the cake, hybrid interface system 110 updates inventory data 286 of supply chain planner 140 to update the inventory system to update the item location. According to embodiments, supply chain planner 140 comprises one or more modules that manage and operate warehouse operations, plan timing and identity of shipments, generate picklists, packing plans, and instructions. Supply chain planner 140 may instruct users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate supply chain planner 140 determining routing, packing, or placement of any item, package, or container into any packing area, including, packing any item, package, or container in another item, package, or container. Supply chain planner 140 may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like. In addition, or as an alternative, embodiments contemplate supply chain planner 140 comprising an inventory system. The inventory system comprises a server configured to receive and transmit item data, including item identifiers, pricing data, attribute data, inventory levels, and other like data about one or more items at one or more stocking locations in a supply chain network. The server stores and retrieves item data from a database of the inventory system or from one or more locations in a supply chain network, such as, for example, in response to scanning of an item by sensors 206 of one or more interactive display devices 120.

Figure 26:
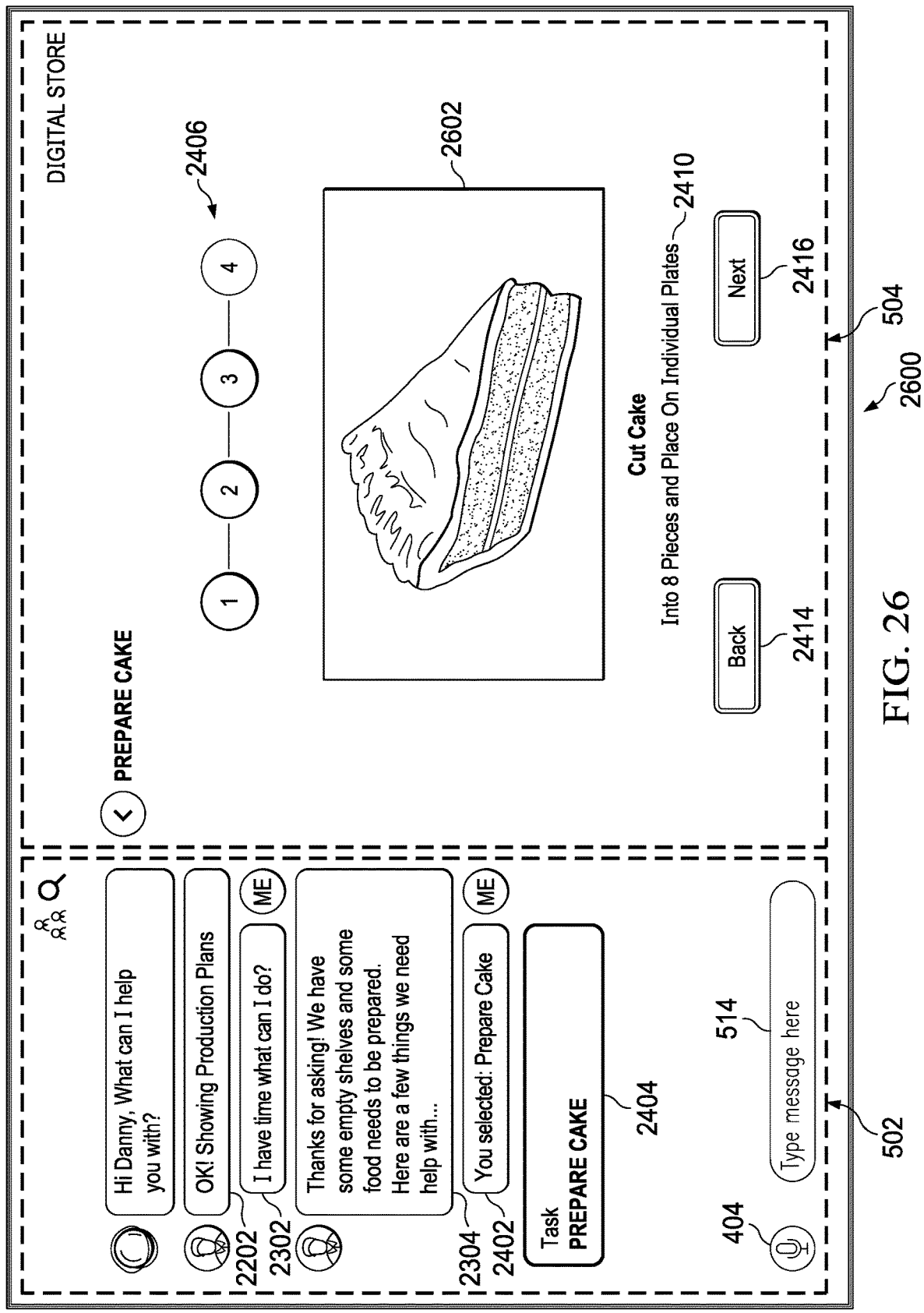

FIG. 26 illustrates third action item 2600 of a cake preparation task, in accordance with an embodiment. In this activity, the user is instructed to cut the cake, along with visualization 2602 comprising a picture indicating how the cake should be cut.

Figure 27:
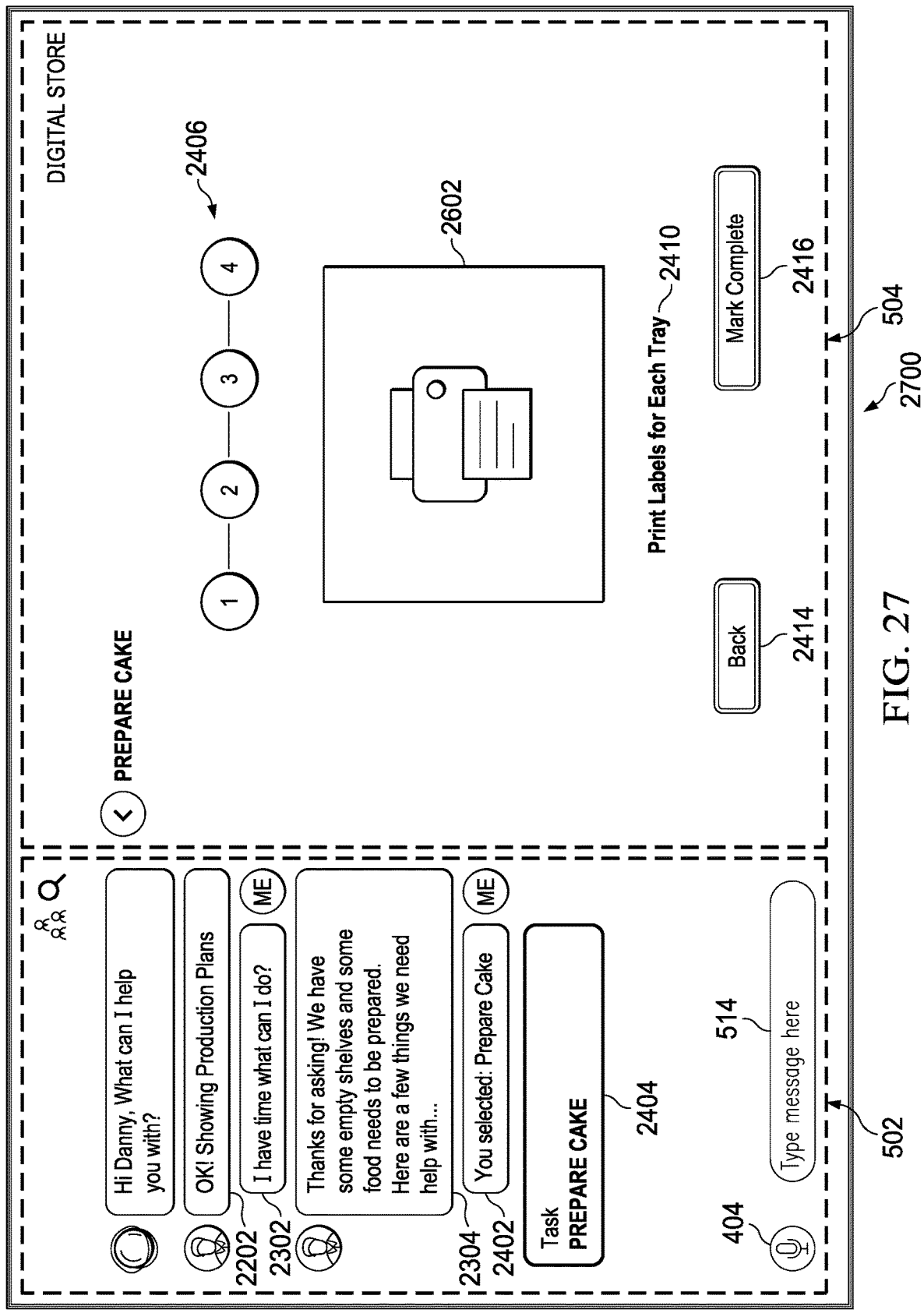

FIG. 27 illustrates fourth action item 2700 of a cake preparation task, in accordance with an embodiment. In this fourth activity, instructions 2410 instruct the user to print labels for each tray and visualization 2602 is updated to illustrate a printer for printing labels associated with this activity. In addition, forward navigation button 2416 is automatically updated with the text "mark complete" which indicates that the current activity is the final activity of the task, and, when completed, hybrid interface system 110 will receive an indication that the task from the task list for the current worker is finished and update the workforce management system 130 accordingly. Continuing with the illustrated example, the worker is unable to complete the task and asks the virtual assistant for help to arrange the cake.

Figure 28:
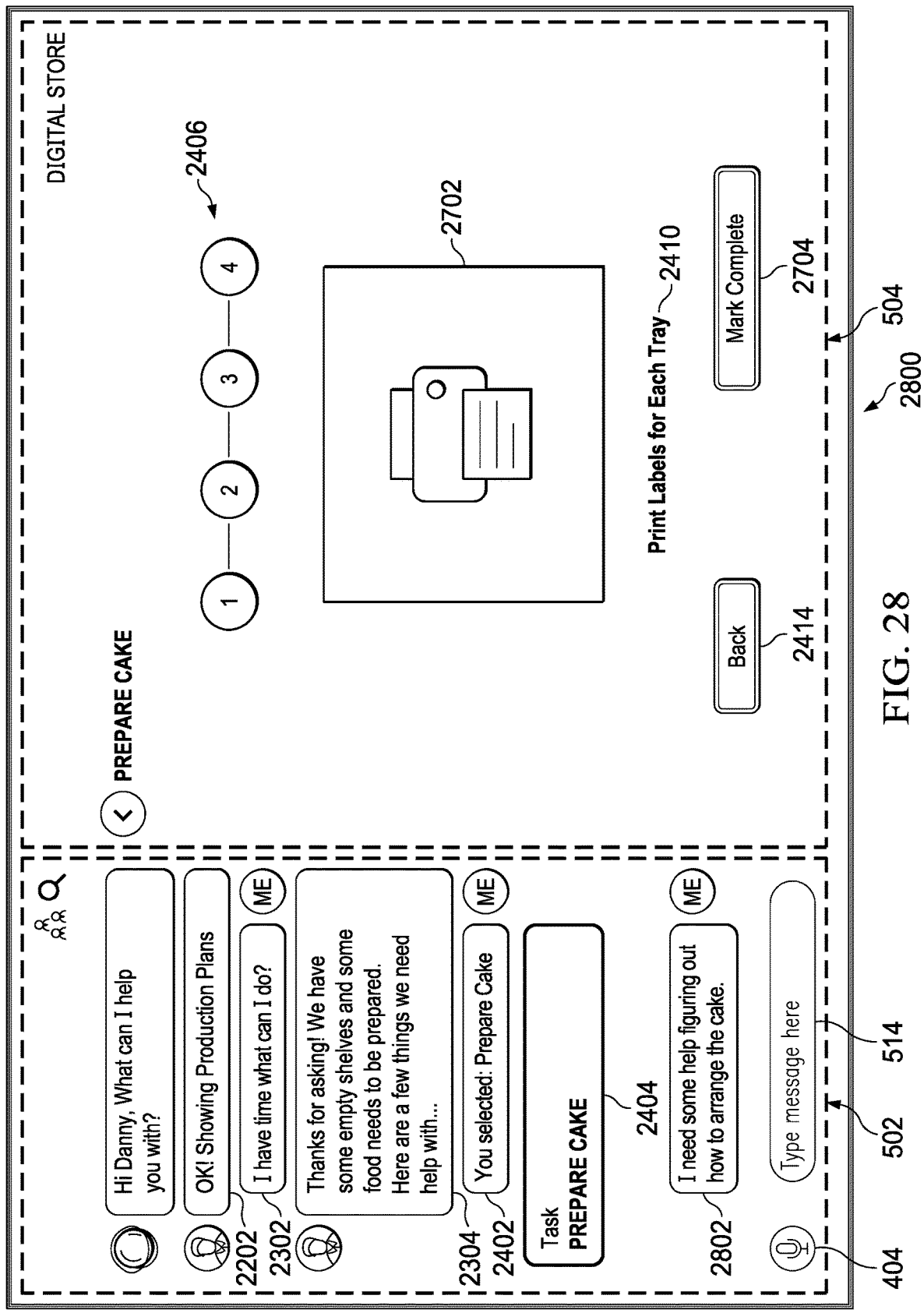

FIG. 28 illustrates user help request 2800, in accordance with an embodiment. Chatbot interface 502 updates to display the user request 2802 which indicates that the virtual assistant received user help request 2800 for assistance arranging the cake.

Figure 29:
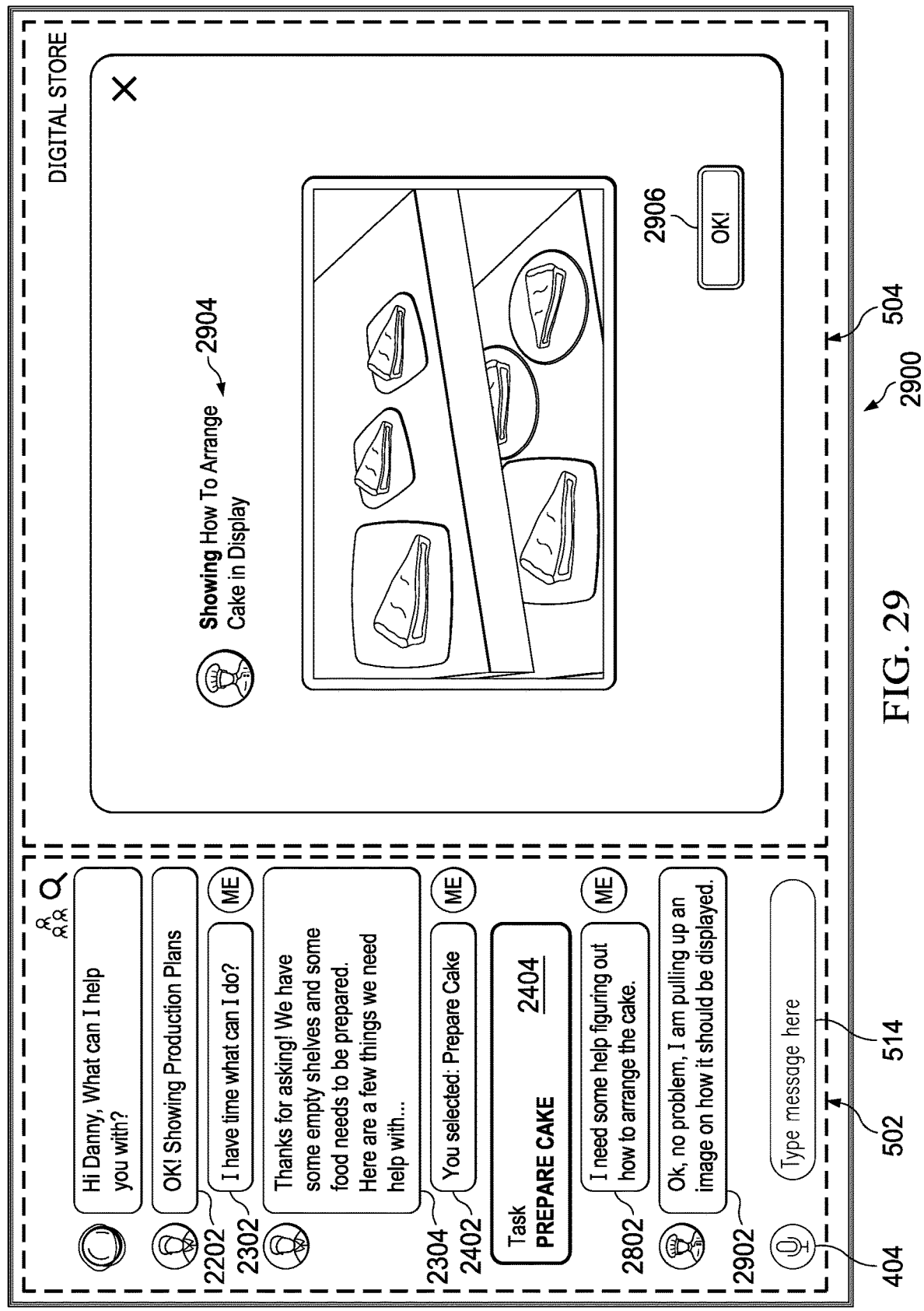

FIG. 29 illustrates response to user help request 2900, in accordance with an embodiment. In this example, the user has requested help to arrange the cake in a display. In response, the chef visual assistant provides a response 2902 on chatbot interface and visualization 2904 on GUI interface 504 comprising an image displaying the proper arrangement of the cake. Although this example illustrates a chef virtual assistant providing an image to properly arrange cake slices, embodiments contemplate hybrid interface system 110 providing a virtual assistant for any role and transmitting information or images needed to complete a task to any worker, according to particular needs. After arranging the cake properly and selecting completion button 2906 ("OK!").

Figure 30:
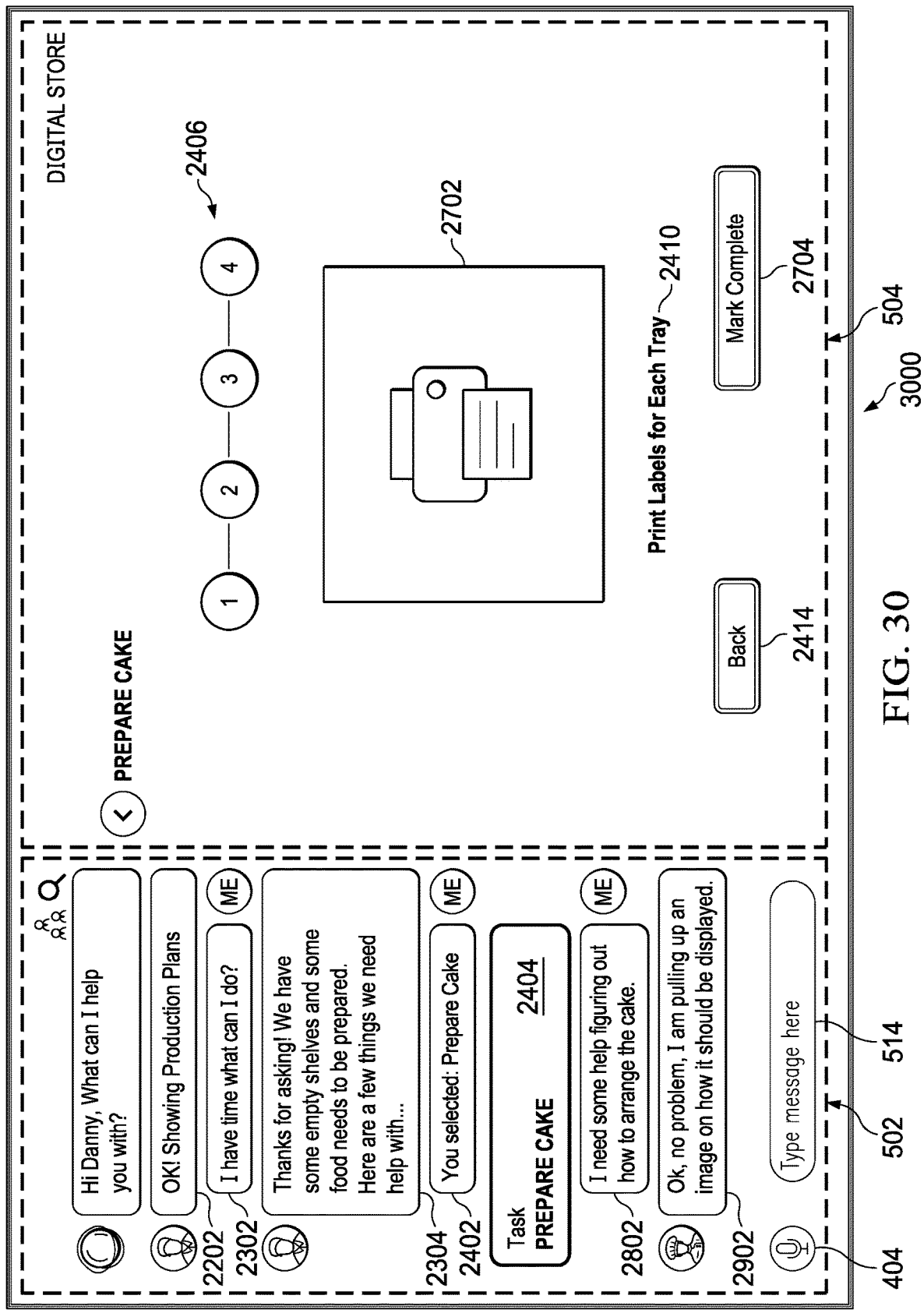

FIG. 30 illustrates fourth action item 3000 of a cake preparation task, in accordance with a further embodiment. Hybrid interface system 110 returns the hybrid interactive display of one or more interactive display devices 120 to the activity of the task prior to interruption with the user help request. Now that the current activity is complete, the user selects "Mark Complete", and in response, hybrid interface system 110 updates the status of the task at workforce management system 130 to indicate the task is completed.

Figure 31:
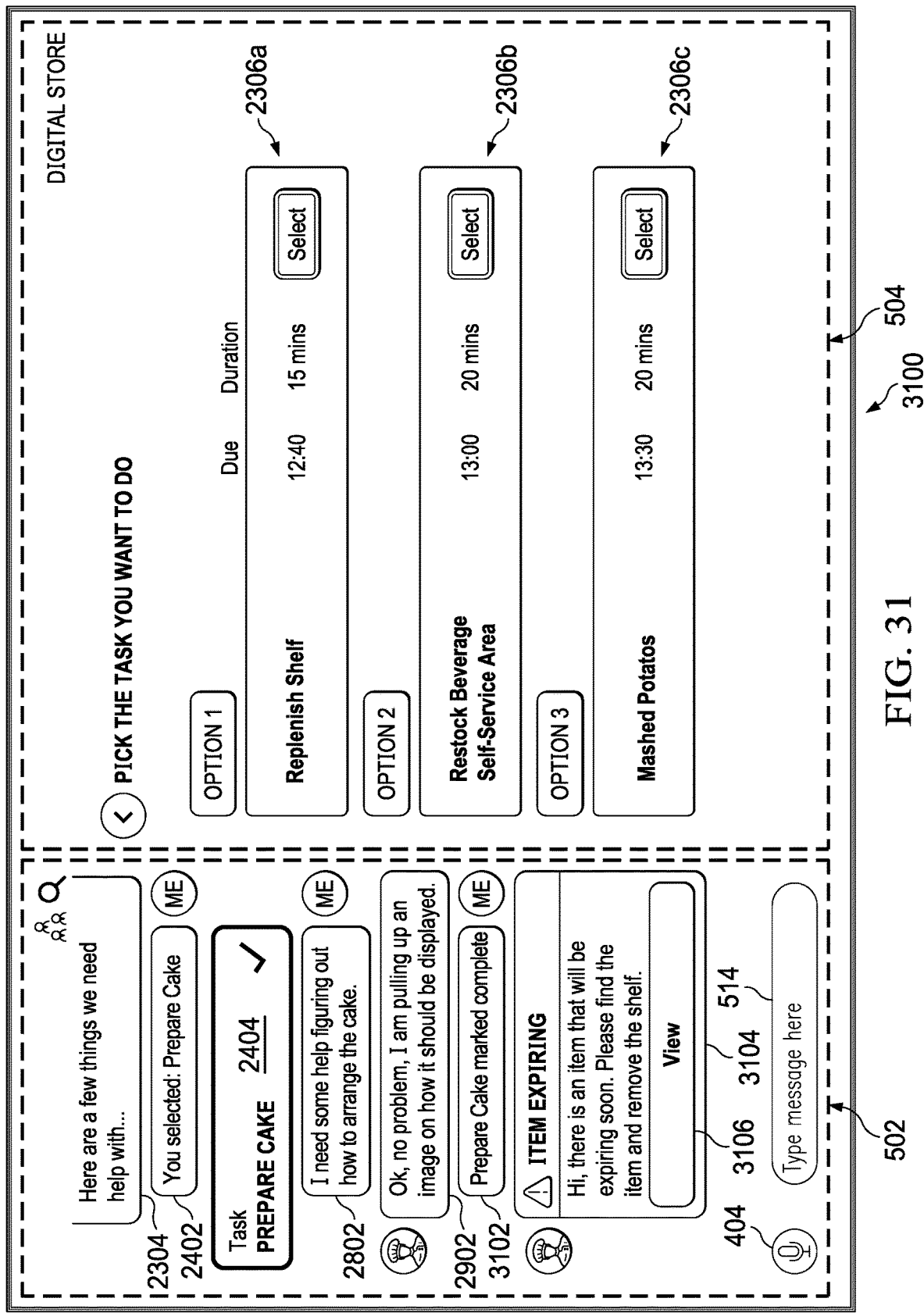

FIG. 31 illustrates task selection tool 3100, in accordance with an embodiment. After completing a task, one or more interactive display devices 120 displays the task selection screen again. Chatbot interface 502 provides response 3102 indicating the prepare cake task is completed. While viewing the task selection screen, the virtual chef assistant has sent an alert 3104 to the user using a message in chatbot interface 502 and indicating that an item is expiring. In response to the user selecting view button 3106, the display is updated to display further details associated with the expiring food.

Figure 32:
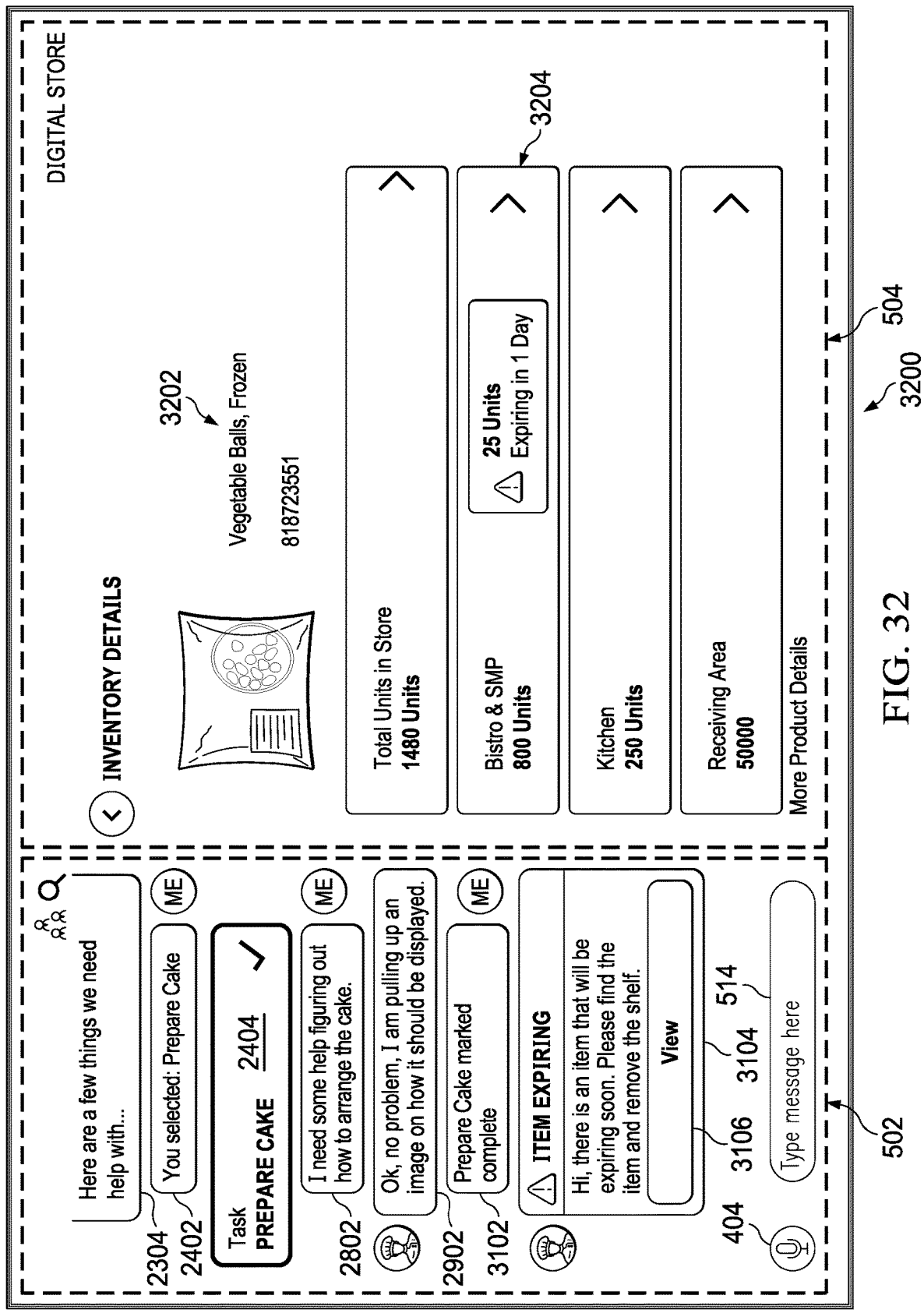

FIG. 32 illustrates inventory details 3200, in accordance with an embodiment. As disclosed above, hybrid interface system 110 receives inventory data 286, which may comprise the expected expiration of food items stocked at a particular stocking location. In the current example, item description 3202 provides item description information and item location information 3204 provides information received from an inventory management system indicating the current number and location of the currently viewed item.

Figure 33:
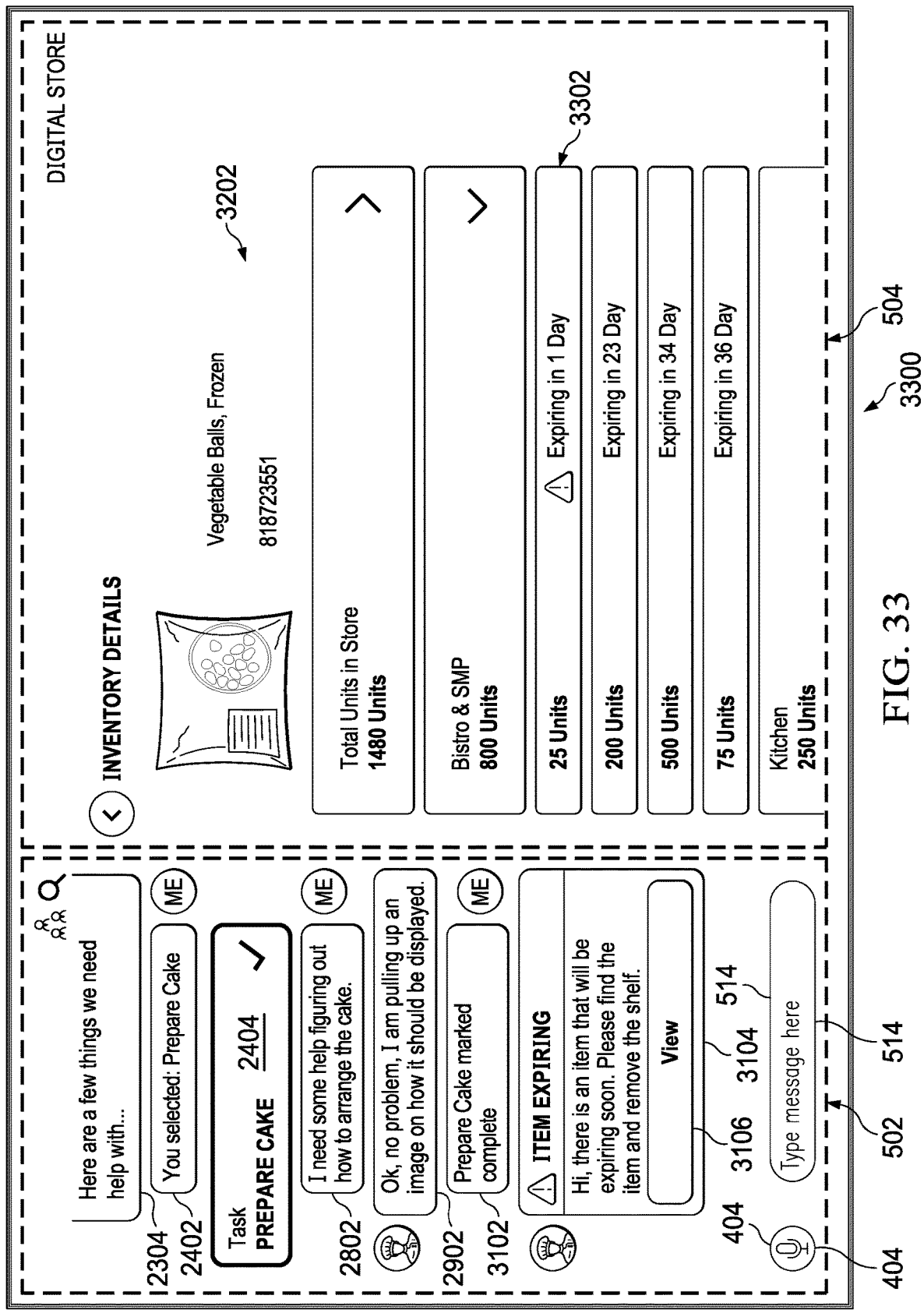

FIG. 33 illustrates inventory details 3300, in accordance with a further embodiment. A user may select an inventory item to view additional details 3302 comprising the location and expiration time of the expiring food item.

Figure 34:
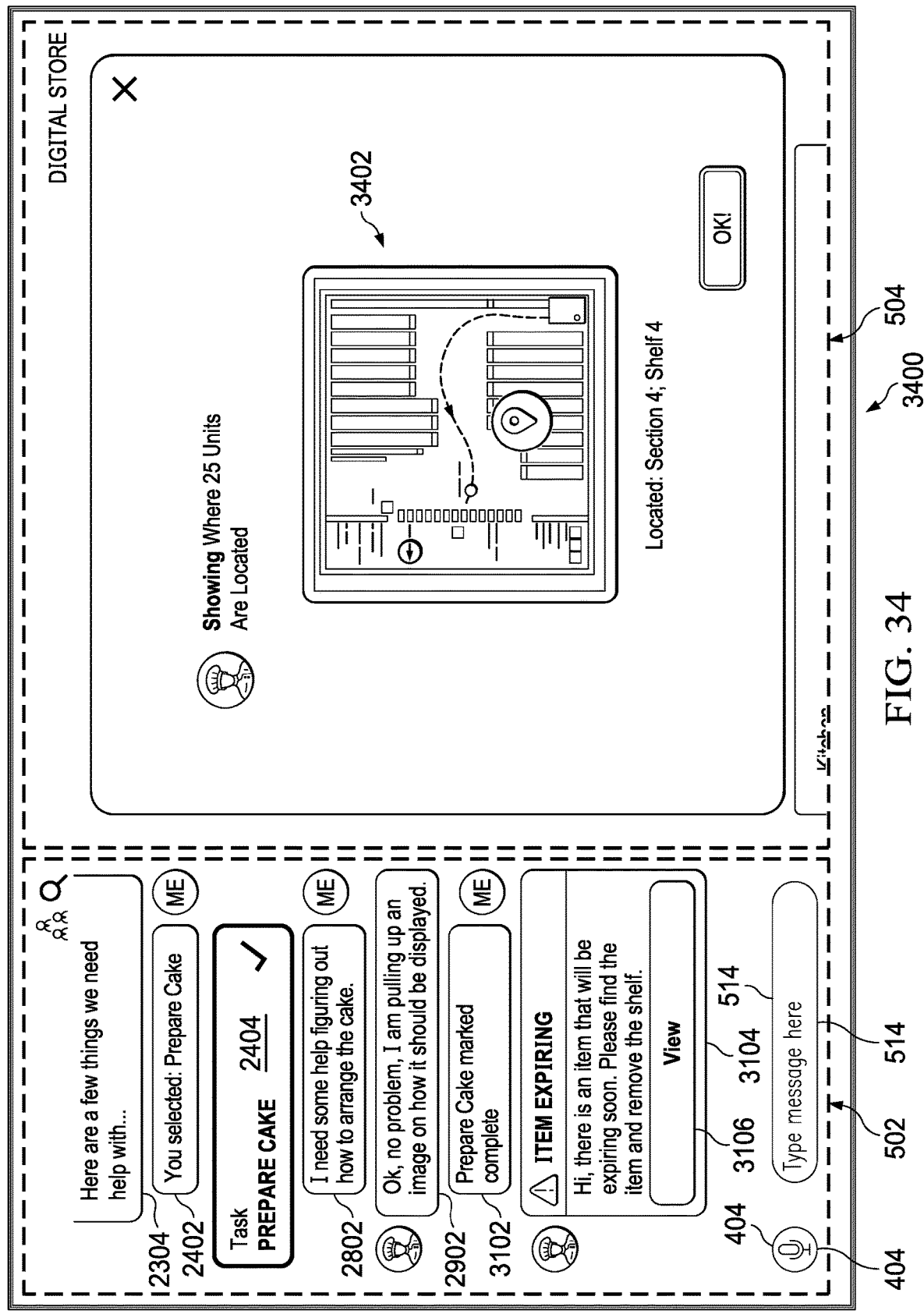

FIG. 34 illustrates further inventory details 3400, in accordance with a third embodiment. Hybrid interface system 110 may indicate on map 3402 or by providing directions, coordinates, or the like, for the user to locate the expiring item and remove it from the stocking location for proper disposal.

Figure 35:
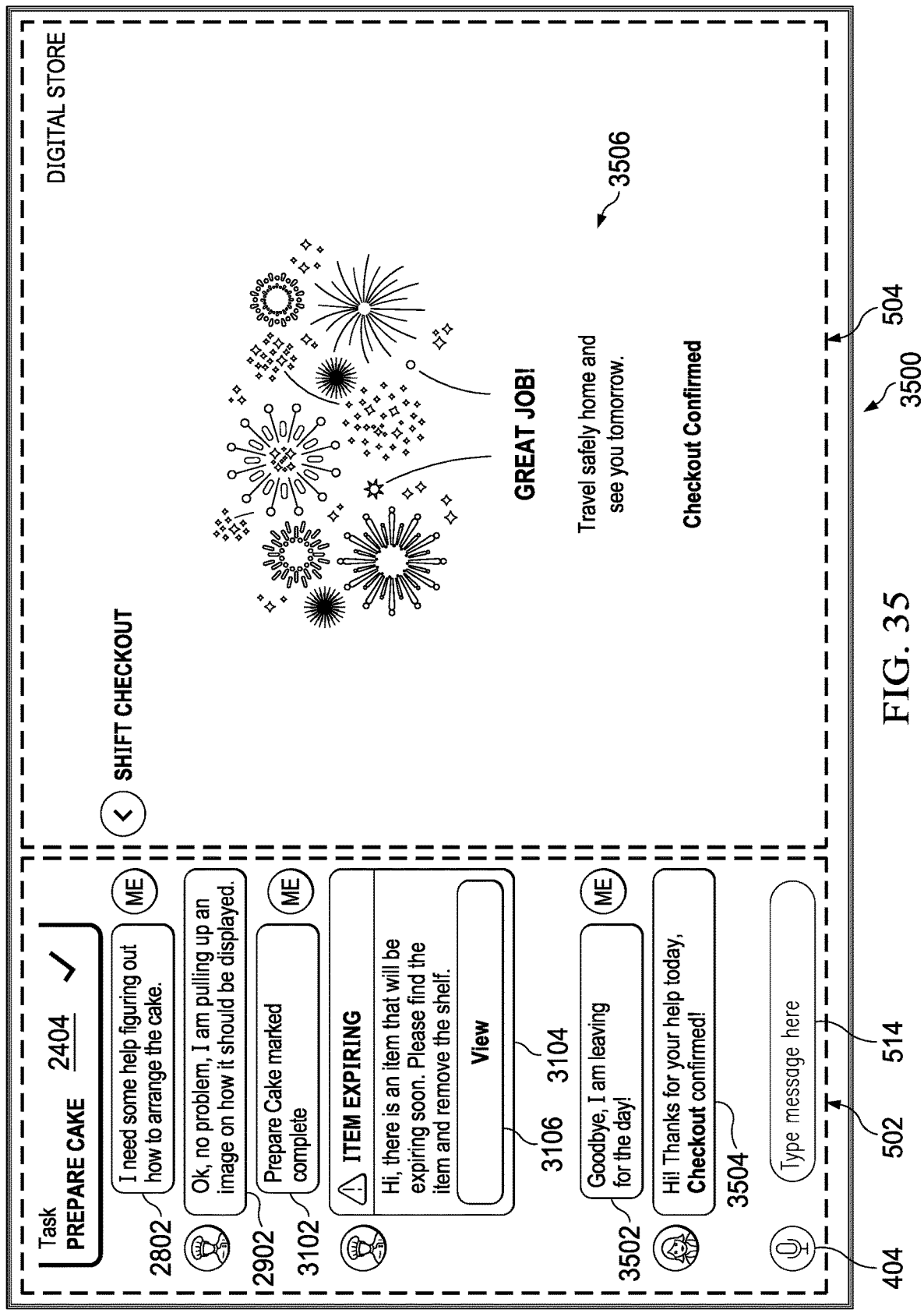

FIG. 35 illustrates task completion confirmation 3500, in accordance with an embodiment. In response to a user input 3502, "Goodbye, I am leaving for the day," hybrid interface system 110 displays response 3504 on chatbot interface 502 and simultaneously displays congratulatory message and graphics 3506 on GUI interface 504, which indicates the worker's checkout is confirmed. As disclosed above, workforce management system 130 may be updated to indicate the checkout time of the worker. Embodiments additionally contemplate providing a notification to a supervisor, coworker, or the like, a message indicating that the current user has clocked out for the day, and the like, according to particular needs.

Although embodiments of FIGS. 4-35 are shown and described as having virtual personas of a chef, a supervisor, and a logistics expert, embodiments contemplate creating any virtual persona for expertise areas relevant to other virtual workforce management and integration, inventory management of items, planning and executing use of alternative items when delivery of items is disrupted, and tasks associated with workers, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A method for augmenting a conversational dialogue with a virtual assistant, comprising:
   ranking and organizing hierarchically, by a computer, one or more roles of one or more workers and one or more virtual assistants to define relationships between the one or more workers and the one or more virtual assistants, wherein the one or more roles of the one or more virtual assistants are supervisory to the one or more roles of the one or more workers;
   assigning, by the one or more virtual assistants, one or more tasks to the one or more workers, based, at least in part, on the supervisory role of the one or more virtual assistants;
   receiving, by an interactive display device comprising a display, one or more processors, and a memory, a user input comprising a natural language input;
   mapping, by a virtual assistant, the natural language input according to one or more meta-classes for user intents that model a response based, at least in part, on rulesets interpreting the natural language input and the complexity of response data; and
   activating, by the virtual assistant, an interactive display device that compensates for the limitations of the natural language input by providing graphic data visualization and user input options to navigate along data and respond to a conversational dialogue according to the defined relationships.

2. The method of claim 1, wherein the interactive display device comprises an active chatbot interface and a navigable user interface.

3. The method of claim 2, wherein a pattern for displaying one or more items by the navigable user interface is simultaneously used to display the same one or more items by the active chatbot interface.

4. The method of claim 2, wherein selections in the navigable user interface are used as tokens by the active chatbot interface.

5. The method of claim 2, wherein a micro-episode is associated with an option to navigate to the intent.

6. The method of claim 2, wherein the interactive display device is associated with a role and the active chatbot interface displays the response according to the mapped intent, when the mapped intent indicates the response requires approval.

7. The method of claim 2, wherein the virtual assistant determines that the response to the user input requires selection of an item from a list of items in a dataset and, in response, displays the list of items by the navigable user interface and prompts, by the active chatbot interface, the user to select at least one item from the displayed list of items.

8. The method of claim 2, wherein the virtual assistant determines that the response to the user input comprises providing instructions to perform a multi-step task and, in response, displays a multi-step walkthrough of the multi-step task by the navigable user interface.

9. A non-transitory computer-readable storage media embodied with software for augmenting a conversational dialogue with a virtual assistant, the software when executed using one or more computers is configured to:
  rank and organize hierarchically one or more roles of one or more workers and one or more virtual assistants to define relationships between the one or more workers and the one or more virtual assistants, wherein the one or more roles of the one or more virtual assistants are supervisory to the one or more roles of the one or more workers;
  assign, by the one or more virtual assistants, one or more tasks to the one or more workers, based, at least in part, on the supervisory role of the one or more virtual assistants;
  receive, by an interactive display device comprising a display, one or more processors, and a memory, a user input comprising a natural language input;
  map, by a virtual assistant, the natural language input according to one or more meta-classes for user intents that model a response based, at least in part, on rulesets interpreting the natural language input and the complexity of response data; and
  activate, by the virtual assistant, an interactive display device that compensates for the limitations of the natural language input by providing graphic data visualization and user input options to navigate along data and respond to a conversational dialogue according to the defined relationships.

10. The non-transitory computer-readable storage media of claim 9, wherein the interactive display device comprises an active chatbot interface and a navigable user interface.

11. The non-transitory computer-readable storage media of claim 10, wherein a pattern for displaying one or more items by the navigable user interface is simultaneously used to display the same one or more items by the active chatbot interface.

12. The non-transitory computer-readable storage media of claim 10, wherein selections in the navigable user interface are used as tokens by the active chatbot interface.

13. The non-transitory computer-readable storage media of claim 10, wherein a micro-episode is associated with an option to navigate to the intent.

14. The non-transitory computer-readable storage media of claim 10, wherein the interactive display device is associated with a role and the active chatbot interface displays the response according to the mapped intent, when the mapped intent indicates the response requires approval.

15. The non-transitory computer-readable storage media of claim 10, wherein the virtual assistant determines that the response to the user input requires selection of an item from a list of items in a dataset and, in response, displays the list of items by the navigable user interface and prompts, by the active chatbot interface, the user to select at least one item from the displayed list of items.

16. The non-transitory computer-readable storage media of claim 10, wherein the virtual assistant determines that the response to the user input comprises providing instructions to perform a multi-step task and, in response, displays a multi-step walkthrough of the multi-step task by the navigable user interface.

17. The non-transitory computer-readable storage media of claim 9, wherein the one or more metaclasses are selected from a group consisting of: recognize, overview, select, enter and initiate.

18. The non-transitory computer-readable storage media of claim 9, wherein the software is further configured to:
  display, by the interactive display device in response to the mapping:
  an answer to a question, an analytic to a question, one or more objects in response to a query, a list with choices, or a guided procedure comprising one or more activities.

19. The non-transitory computer-readable storage media of claim 9, wherein the software is further configured to:
  assign a persona to the virtual assistant corresponding to an on-site expert or a remotely-located expert.

20. The non-transitory computer-readable storage media of claim 9, wherein the software is further configured to:
  display an avatar indicating the virtual assistant is the sender of a response when mapping the natural language input to a user intent.

* * * * *